(12) United States Patent
Fukumoto

(10) Patent No.: US 7,454,054 B2
(45) Date of Patent: Nov. 18, 2008

(54) THREE-DIMENSIONAL SHAPE INPUT DEVICE

(75) Inventor: Tadashi Fukumoto, Ibaraki (JP)

(73) Assignee: Konica Minolta Sensing, Inc., Osaka (JP)

( * ) Notice: Subject to any disclaimer, the term of this patent is extended or adjusted under 35 U.S.C. 154(b) by 554 days.

(21) Appl. No.: 11/121,333

(22) Filed: May 3, 2005

(65) Prior Publication Data
US 2005/0249400 A1 Nov. 10, 2005

(30) Foreign Application Priority Data
May 7, 2004 (JP) ............... 2004-138927

(51) Int. Cl.
G06K 9/00 (2006.01)
(52) U.S. Cl. .................. 382/154
(58) Field of Classification Search ........... None
See application file for complete search history.

(56) References Cited

U.S. PATENT DOCUMENTS

| 6,141,105 | A  | * | 10/2000 | Yahashi et al. | ........... | 356/623 |
| 6,172,755 | B1 | * | 1/2001 | Norita et al. | ........... | 356/602 |
| 6,603,462 | B2 | * | 8/2003 | Matusis | ........... | 345/173 |
| 2002/0131056 | A1 | * | 9/2002 | Fujii et al. | ........... | 356/608 |

FOREIGN PATENT DOCUMENTS

| JP | 07-174537 | 7/1995 |
| JP | 10-2712 | 1/1998 |
| JP | 10096606 | 4/1998 |
| JP | 10-326345 | 12/1998 |
| JP | 10002711 | 1/1999 |
| JP | 11-153430 | 6/1999 |
| JP | 2002-58046 | 2/2002 |

OTHER PUBLICATIONS

Communication and European Search Report for EP Application No. 05 00 9321, dated Aug. 23, 2005, 3 pages.

* cited by examiner

Primary Examiner—Matthew C Bella
Assistant Examiner—Alex Liew
(74) Attorney, Agent, or Firm—Brinks Hofer Gilson & Lione

(57) ABSTRACT

A three-dimensional shape input device for entering a three-dimensional shape of an object by a light projection method is provided, which includes a light projecting portion for projecting detection light onto an object, and an imaging portion for receiving reflected light from the object. The device includes a storage portion for storing a parameter that is used for computing the three-dimensional shape, a computing portion for computing the three-dimensional shape of the object by using image data delivered from the imaging portion and the parameter, and a dividing portion for dividing an imaging surface of an image sensor into plural areas. The storage portion stores parameters each of which is to be applied to each of the areas. The computing portion performs computation for each of the areas by using a parameter to be applied to each of the areas.

12 Claims, 18 Drawing Sheets

FIG. 18(a)
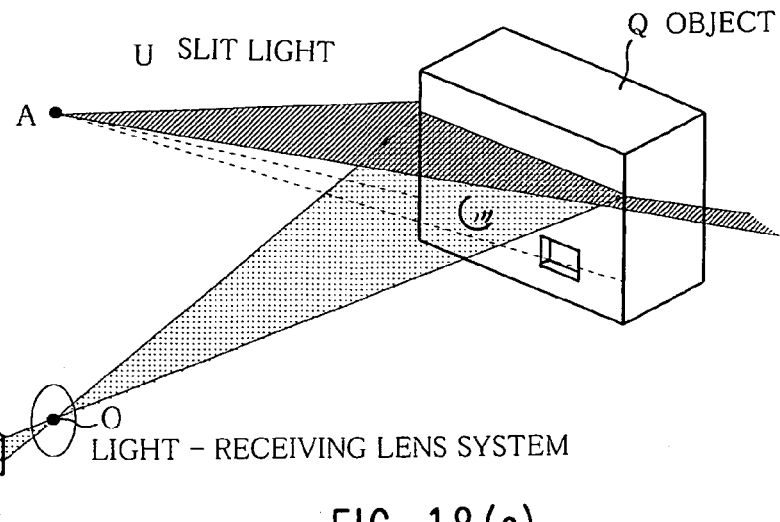
FIG. 18(b)
FIG. 18(c)
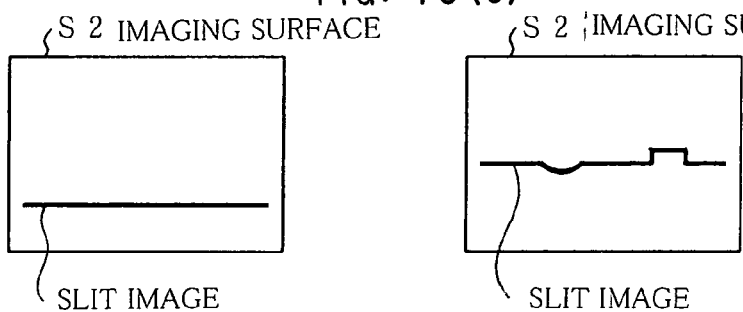
FIG. 18(d)
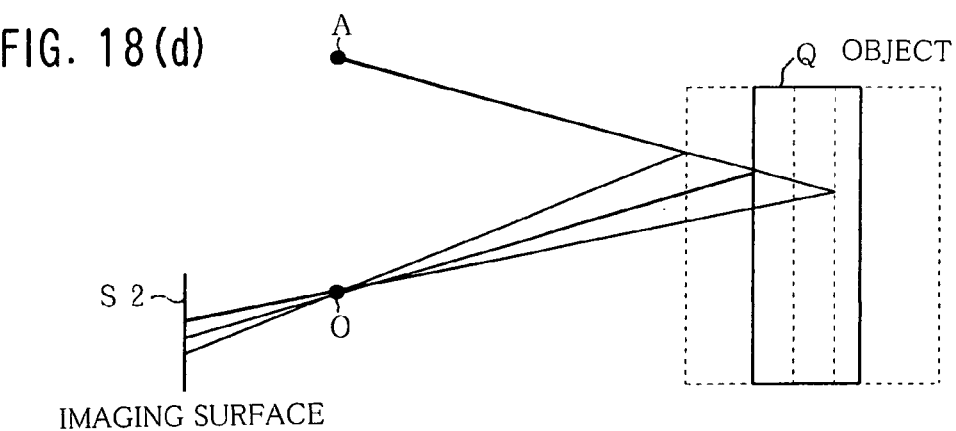

THREE-DIMENSIONAL SHAPE INPUT DEVICE

This application is based on Japanese Patent Application No. 2004-138927 filed on May 7, 2004, the contents of which are hereby incorporated by reference.

BACKGROUND OF THE INVENTION

1. Field of the Invention

The present invention relates to a three-dimensional shape input device for measuring a three-dimensional shape of an object in a noncontact manner by a light projection method and entering the measurement result. More specifically, the present invention relates to a device that computes the three-dimensional shape by using an optimal parameter for each sectioned imaging area on an imaging surface.

2. Description of the Prior Art

In order to enter three-dimensional shape data of an object, a noncontact type three-dimensional shape input device is often used. This device projects detection light onto the object and receives reflected light from the object by an image sensor. This method is called a light projection method.

For example, in a slit light projection method (also called a light-section method), slit light having a slit-like cross section is used as the detection light that is projected, and the slit light is deflected so as to scan the object optically (see U.S. Pat. No. 6,141,105).

FIGS. 18(a)-18(d) show a general outline of the slit light projection method, and FIGS. 19(a)-19(c) show a principle of measurement by the slit light projection method.

In FIG. 18, slit light U is projected onto an object Q, and reflected light from the object Q enters the imaging surface S2 of the image sensor (FIG. 18(a)). If an irradiated part of the object Q is flat, an obtained image (a slit image) is a straight line (FIG. 18(b)). If the irradiated part has pits and projections, the line becomes a curved or step-like shape (FIG. 18(c)). Namely, a distance between the measuring device and the object Q is reflected in an incident position of the reflected light on the imaging surface S2 (FIG. 18(d)). When deflecting the slit light U in its width direction (the vertical direction in FIG. 18), the surface of the object Q is scanned so that sampling of three-dimensional positions is performed.

As shown in FIG. 19, a light projecting system and a light receiving system are positioned so that a base line AO that links a starting point A of the emitted light and a principal point O of a lens of the light receiving system becomes perpendicular to a light reception axis. The light reception axis is perpendicular to the imaging surface S2. Note that the principal point of a lens is a point (a rear principal point) that is away from the imaging surface S2 by an image distance b on the light reception axis when an image of a subject at a finite distance is formed on the imaging surface S2. Hereinafter, the image distance b may be referred to as an effective focal distance Freal.

The principal point O is regarded as the origin of a three-dimensional rectangular coordinate system. The light reception axis is the Z axis, the base line AO is the Y axis, and a lengthwise direction of the slit light is the X axis. θa represents an angle between a light projection axis and a light projection reference plane (a light projection plane that is parallel with the light reception axis), and θp represents an acceptance angle when the slit light U is projected onto a point P(X,Y,Z) on the object. Then, the coordinate Z of the point P can be expressed by the equation (1).

The base line length $L=L1+L2=Z\tan\theta a+Z\tan\theta p$

Therefore, $Z=L/(\tan\theta a+\tan\theta p)$ (1)

Note that the acceptance angle θp is the angle between the line that links the point P and the principal point O and a plane that includes the light reception axis (a light reception axis plane).

As an imaging magnification $\beta=b/Z$, the coordinates X and Y of the point P are expressed by the equations (2) and (3), when xp represents a distance between the center of the imaging surface S2 and a light receiving pixel in the X direction, and yp represents a distance between them in the Y direction (see FIG. 19(a)).

$X=xp/\beta$ (2)

$Y=yp/\beta$ (3)

The angle θa can be derived from an angular velocity of deflection of the slit light U. The acceptance angle θp can be derived from the relationship of the equation below.

$\tan\theta p=b/yp$

Namely, by measuring a position(xp,yp) on the imaging surface S2, the three-dimensional position of the point P can be determined in accordance with the angle θa.

In this way, the three-dimensional shape data according to the light projection method can be calculated relatively easily by using various parameters including camera parameters and light projecting optical system parameters and by applying a camera sight line equation and a detection light plane equation.

The above description is on the premise that an ideal thin lens system is used. In a real thick lens system, the principal point O is divided into a front principal point H and a rear principal point H' as shown in FIG. 19(c).

In addition, there is known other light projection method in which spot light, step light or density pattern light is projected instead of the slit light. For example, Japanese Patent No. 2913021 discloses a device for entering three-dimensional shape data of an object by a pattern projection method. According to the method, space coordinates on the surface of an object Q is calculated from an image of a two-dimensional grid that is drawn on a reference plane, an image of a two-dimensional grid that is projected onto the reference plane, a three-dimensional image on the reference plane, and an image of a two-dimensional grid that is projected onto the object Q.

However, in the slit light projection method disclosed in U.S. Pat. No. 6,141,105, the three-dimensional shape data are calculated on the assumption that the cross section of the slit light is linear, namely, the slit light is a complete plane.

However, in each of the light projecting optical system and the light receiving optical system, an optical shape distortion occurs due to an aberration of a lens. For example, a shape distortion occurs in the slit light due to an aberration of a lens in the light projecting optical system. In addition, an image on the imaging surface S2 is distorted due to an aberration of a lens in the light receiving optical system. In particular, the distortion may often occur at a peripheral portion of the imaging surface S2.

In addition, a cross sectional shape of a laser beam that is projected from a semiconductor laser that is used as a light source is not a complete ellipse, and a cylindrical lens has an aberration. Therefore, the slit light becomes not a flat plane but a curved surface after the laser beam passes through the cylindrical lens.

Furthermore, there is a probability that the slit light is shifted from an ideal plane position because scanning angle is not linear to an input voltage of a galvanomirror for scanning the slit light.

Thus, real slit light and an image of received light are distorted for various reasons in the slit light projection method. For this reason, an error occurs in the obtained three-dimensional shape data, so that precise three-dimensional shape data cannot be obtained.

This problem occurs not only in the slit light projection method but also in other various light projection methods that project spot light, step light or pattern light.

Note that the device disclosed in the Japanese Patent No. 2913021 uses an image of a reference object for each pixel of the image sensor directly for calculating coordinates. As it does not use an optical system parameter, an error due to the parameter does not occur. But, in order to determine three-dimensional shape data with high degree of precision, it is necessary to project plural types of two-dimensional grid patterns and to determine a phase in each direction at high degree of precision by using a pattern coding method or a Fourier transformation phase shifting method. In addition, it is also necessary to draw the two-dimensional grid in different phases on the reference plane so as to determine phases in each direction precisely. Therefore, there is a tendency that the structure or contents of processes of devices become complicated or large scaled, and it is disadvantageous in cost.

SUMMARY OF THE INVENTION

An object of the present invention is to provide a three-dimensional shape input device that can measure and input a three-dimensional shape of an object precisely by a relatively simple structure.

According to a first aspect of the present invention, a three-dimensional shape input device is provided for entering a three-dimensional shape of an object by a light projection method. The device includes a light projecting portion for projecting detection light onto an object, an imaging portion for receiving reflected light from the object, a storage portion for storing a parameter that is used for computing the three-dimensional shape, a computing portion for computing and determining the three-dimensional shape of the object by using image data delivered from the imaging portion and the parameter, a dividing portion for dividing an imaging surface of an image sensor into plural areas. The storage portion stores plural parameters that are used for the plural areas, respectively. The computing portion computes and determines the three-dimensional shape for each area by using a parameter to be used for each area.

Preferably, the computing portion performs the computation by using a camera sight line equation and a detection light plane equation.

The computing portion performs the computation for each of the areas by using a parameter to be applied to each of the areas as a camera parameter that is used for the camera sight line equation.

The computing portion performs the computation for each of the areas by using a parameter to be applied to each of the areas as a light projecting optical system parameter that is used for the detection light plane equation.

In addition, the light projecting portion projects fixed slit light as the detection light.

Further, the light projecting portion scans the object by deflecting projected slit light, and the computing portion performs the computation by using a parameter to be applied to each of the areas that includes an angular velocity parameter of a deflecting mirror for deflecting the slit light.

Moreover, the light projecting portion projects stripe pattern light as the detection light.

The parameter is used that is interpolated so that a value of the parameter becomes continuous at a boundary of the areas.

BRIEF DESCRIPTION OF THE DRAWINGS

FIGS. 18(a)-18(d) show a general outline of a slit light projection method.

DESCRIPTION OF THE PREFERRED EMBODIMENTS

Hereinafter, the present invention will be explained in more detail with reference to embodiments and drawings.

Figure 1:
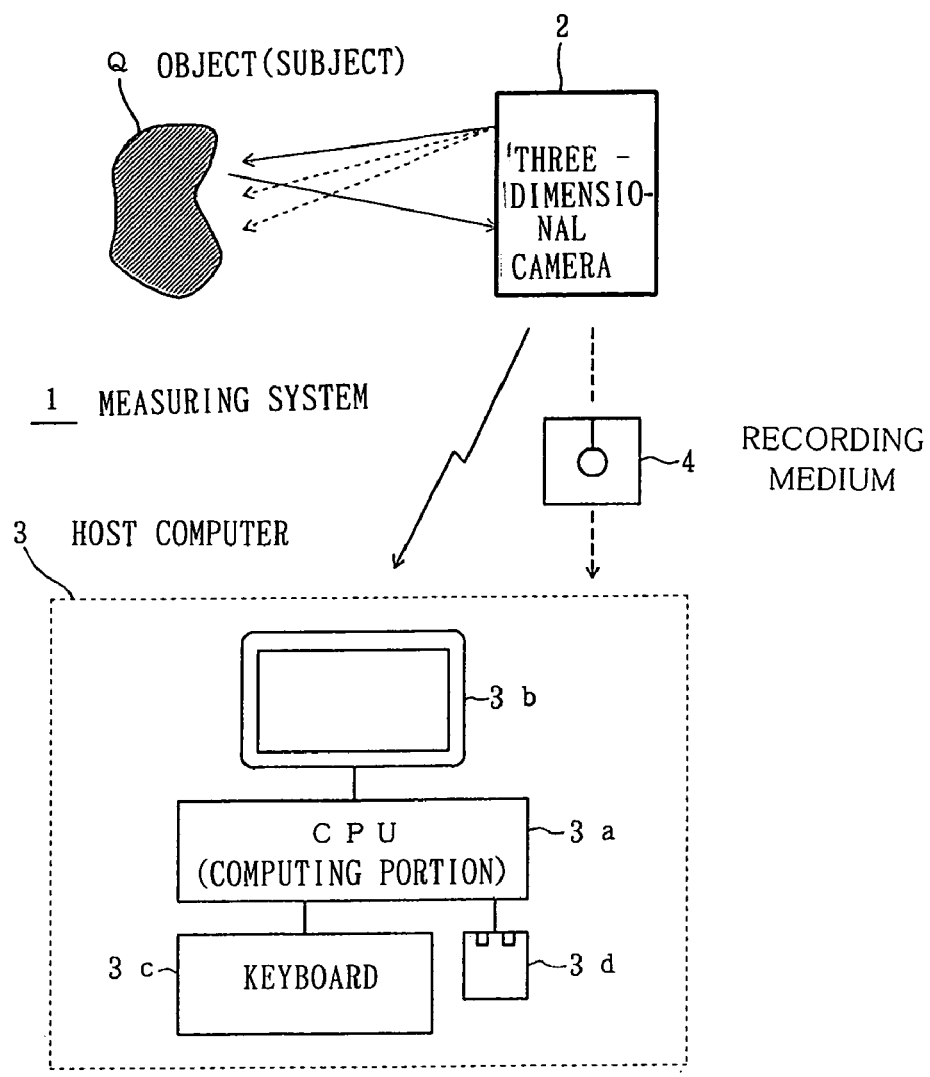
FIG. 1 shows a measuring system according to an embodiment of the present invention.

FIG. 1 shows a measuring system 1 according to an embodiment of the present invention.

As shown in FIG. 1, the measuring system 1 includes a three-dimensional camera 2 that performs three-dimensional measurement by a slit light projection method and a host computer 3 for processing output data of the three-dimensional camera 2.

The three-dimensional camera 2 outputs measured data (slit image data) for specifying three-dimensional positions of plural sampling points on an object Q as well as a two-dimensional image that indicates color information of the object Q, a parameter that is necessary for computing a three-dimensional position of the sampling point, data that are necessary for calibration and others. The host computer 3 uses the data and the parameter so as to calculate and determine the three-dimensional position of the sampling point, i.e., three-dimensional coordinates by applying a triangulation method. When the three-dimensional coordinates are computed, a camera sight line equation, a detection light plane equation and the like are applied.

The host computer 3 is a computer system including a CPU 3a, a display device 3b, a keyboard 3c and a mouse 3d. The CPU 3a is equipped with memories including a ROM and a RAM, and software is installed in the memories for a process of the measured data. In addition, a memory of the CPU 3a stores parameters that are used for computation of the three-dimensional coordinates that will be described later and various computing equations. Between the host computer 3 and the three-dimensional camera 2, data can be communicated on line and off line by using a portable recording medium 4. As the recording medium 4, a magneto-optical disk, a memory chip or the like can be used.

Figure 2A:
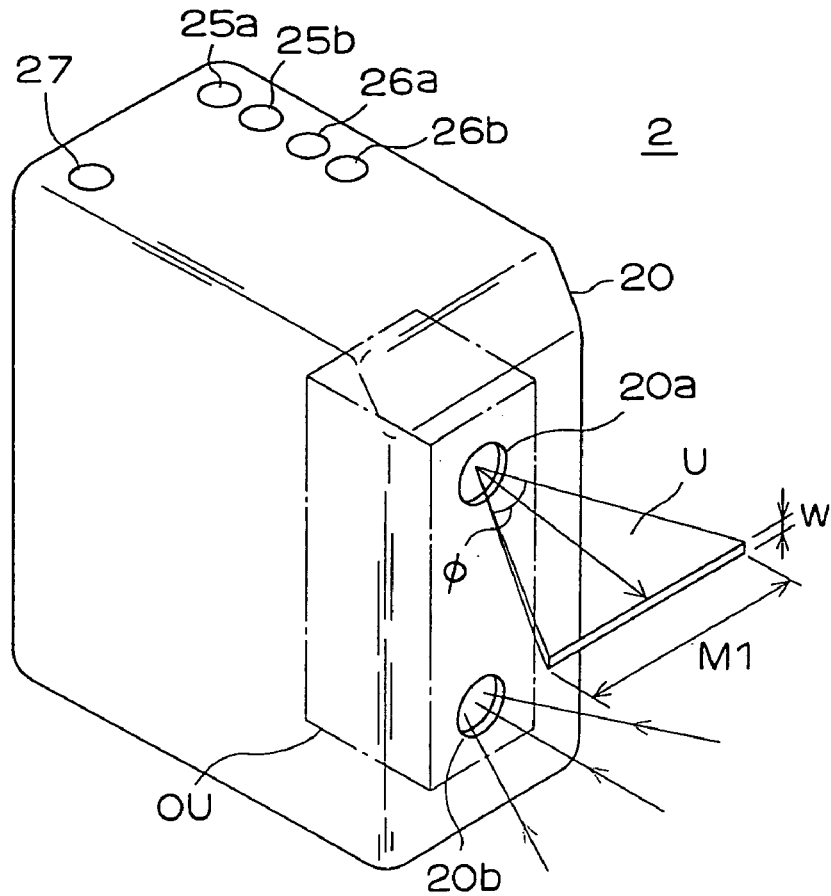
FIGS. 2(a) and 2(b) are perspective views showing an external appearance of a three-dimensional camera.
Figure 2B:
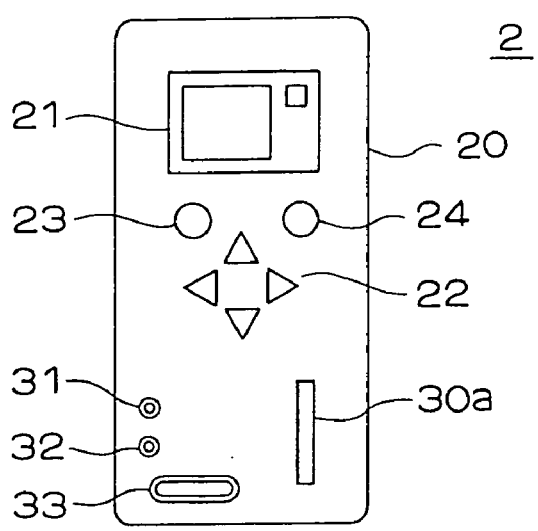

FIGS. 2(a) and 2(b) are perspective views showing an external appearance of the three-dimensional camera 2.

As shown in FIG. 2, the three-dimensional camera 2 includes a housing 20 having a substantially rectangular solid shape that houses an optical unit OU. The housing 20 is provided with a light projecting window 20a and a light receiving window 20b at the front face. The light projecting window 20a is disposed at a position a predetermined distance away from the upper side of the light receiving window 20b. The optical unit OU emits slit light U that is a laser beam extending in the horizontal direction. Namely, the slit light U is plane-like light extending in the horizontal direction by an irradiation angle φ and having a width w in the vertical direction. A length M1 in the horizontal direction of the slit light U varies in accordance with a distance from the light projecting window 20a. However, the shape and the angle of the slit light U are distorted due to various factors as being described later, so the slit light U is not an ideal plane as a matter of fact but has distortions, for example.

The slit light U is directed to the object (subject) Q to be measured. The slit light U is reflected by the surface of the object Q, and a part of it enters the optical unit OU through the light receiving window 20b. Note that the optical unit OU has a biaxial adjustment mechanism for adjusting a relationship between a light projection axis and a light reception axis.

The upper face of the housing 20 is provided with zooming buttons 25a and 25b, manual focusing buttons 26a and 26b, and a shutter button 27. As shown in FIG. 2(b), the rear face of the housing 20 is provided with a liquid crystal display (LCD) 21, a cursor button 22, a selection button 23, a cancellation button 24, analog output terminals 31 and 32, a digital output terminal 33, and an insertion slot 30a for the recording medium 4.

The liquid crystal display 21 is used for displaying operational screens and as an electronic finder. A user can set a shooting mode by using the buttons 21-24 on the rear face. The measured data are delivered via the analog output terminal 31, and the two-dimensional image signal is delivered via the analog output terminal 31.

Figure 3:
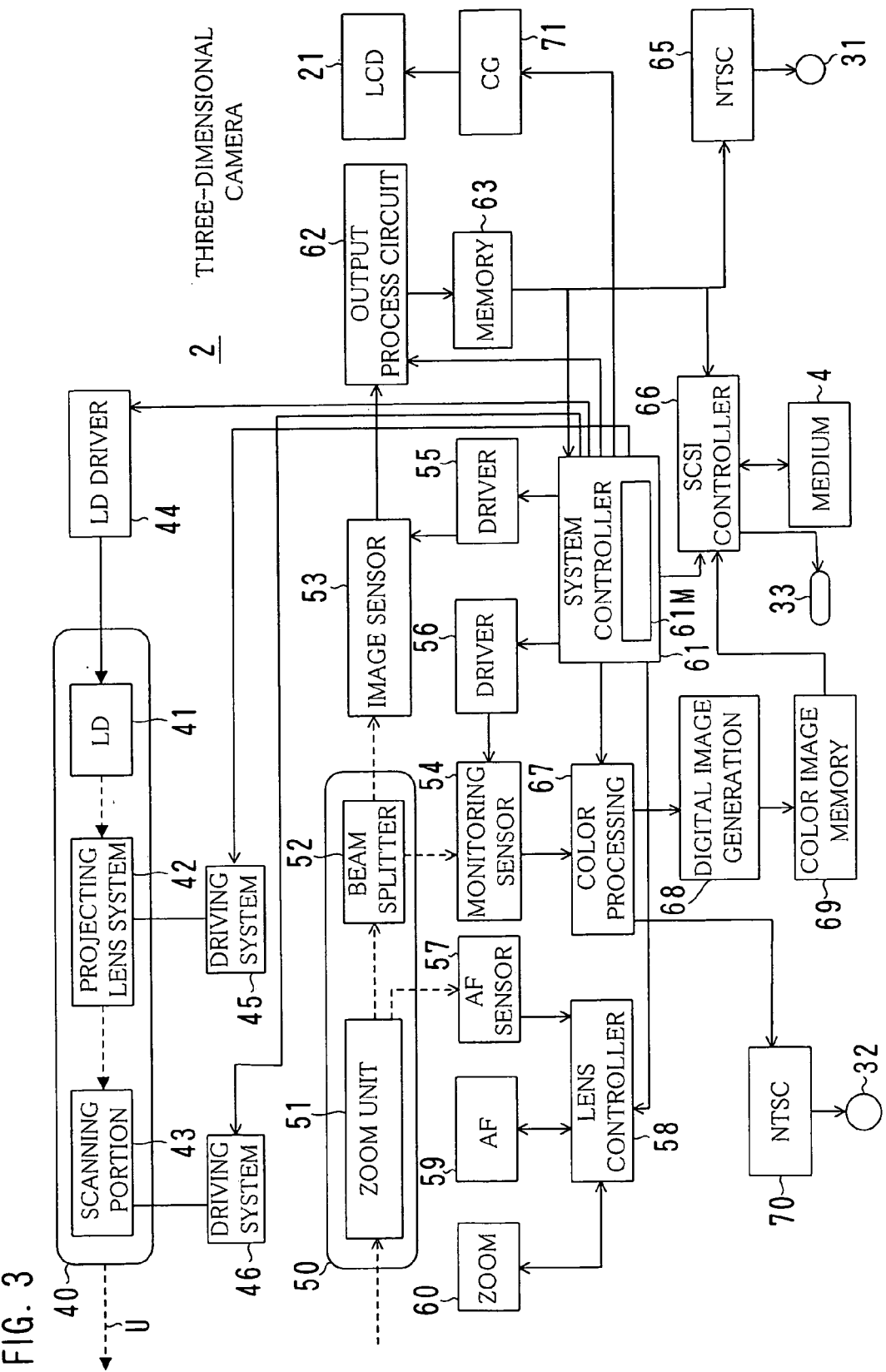
FIG. 3 is a block diagram showing a functional structure of the three-dimensional camera.

FIG. 3 is a block diagram showing a functional structure of the three-dimensional camera 2. In FIG. 3, a solid line with an arrow indicates a flow of an electric signal, while a broken line with an arrow indicates a flow of light.

The three-dimensional camera 2 includes two optical systems 40 and 50 of a light projecting side and a light receiving side, which constitute the above-mentioned optical unit OU. In the optical system 40, a laser beam having the wavelength of 690 nm emitted by a semiconductor laser (LD) 41 passes through a light projecting lens system 42 to be the slit light U and is deflected by a galvanomirror 43 that is scanning means. A driver 44 of the semiconductor laser 41, a driving system 45 of the light projecting lens system 42 and a driving system 46 of the galvanomirror 43 are controlled by a system controller 61.

In the optical system 50, light condensed by a zoom unit 51 is divided by a beam splitter 52. Light having a wavelength within an oscillation wavelength range of the semiconductor laser 41 enters an image sensor 53 that is a measuring image sensor. Light having a wavelength within a visible range enters a color image sensor 54 for monitoring. Each of the image sensor 53 and the color image sensor 54 is an area sensor including a CCD. The zoom unit 51 is an internal focusing type, in which incident light is partially used for automatic focus (AF). The AF function is realized by an AF sensor 57, a lens controller 58 and a focus driving system 59. A zoom driving system 60 is provided for electric zooming.

Imaging information of the image sensor 53 is transmitted to an output process circuit 62 in synchronization with a clock from a driver 55. The output process circuit 62 generates measured data corresponding to pixels of the image sensor 53, and the measured data are stored in a memory 63.

The imaging surface S2 of the image sensor 53 is divided (sectioned) into plural areas ER, and measured data of each pixel are discriminated for each sectioned area. Namely, each of the measured data includes area division information that indicates which area ER the measured data belong to.

Figure 4A:
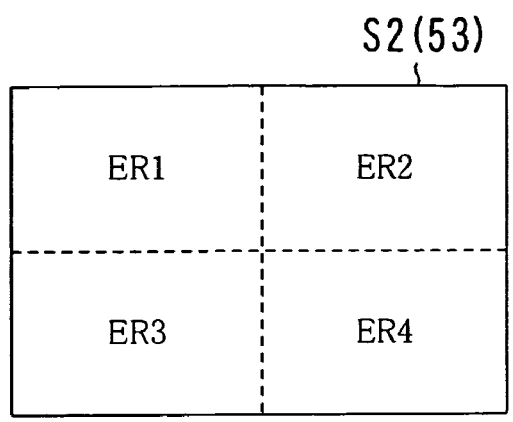
FIGS. 4(a)-4(d) show examples of division of an imaging surface of an image sensor.
Figure 4B:
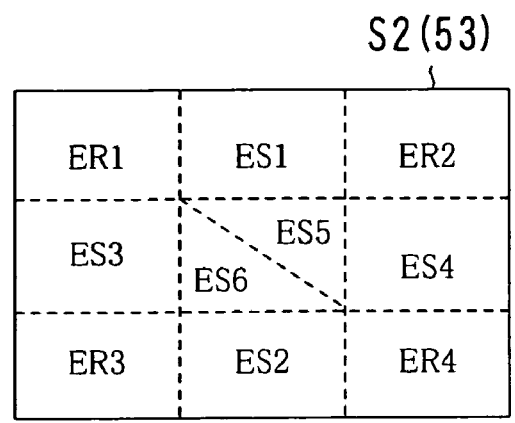
Figure 4C:
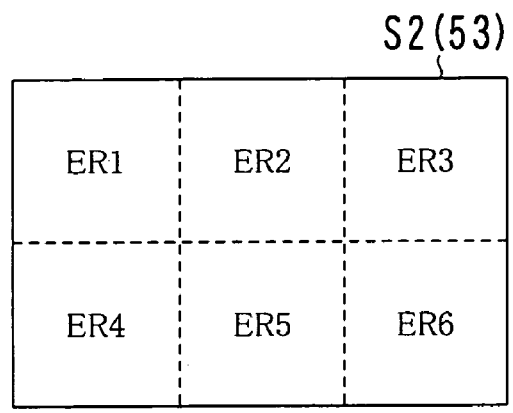
Figure 4D:
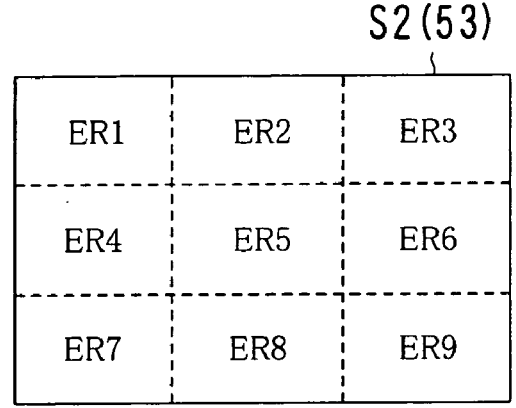
Figure 5:
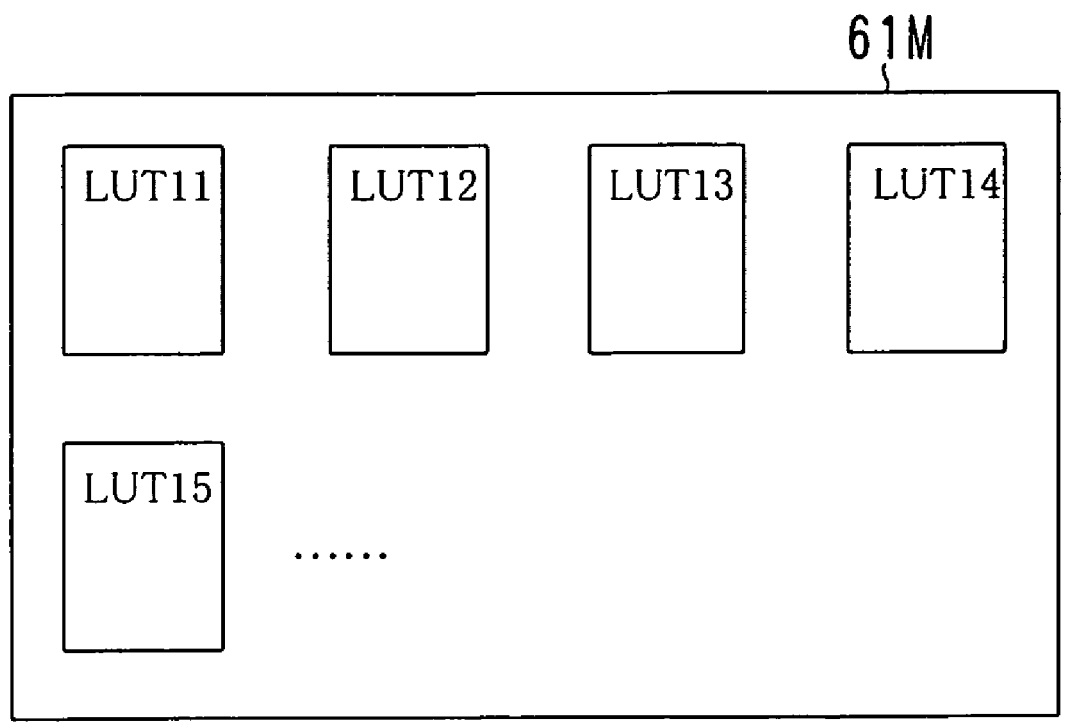
FIG. 5 shows an example of contents of a memory of a system controller.
Figure 6:
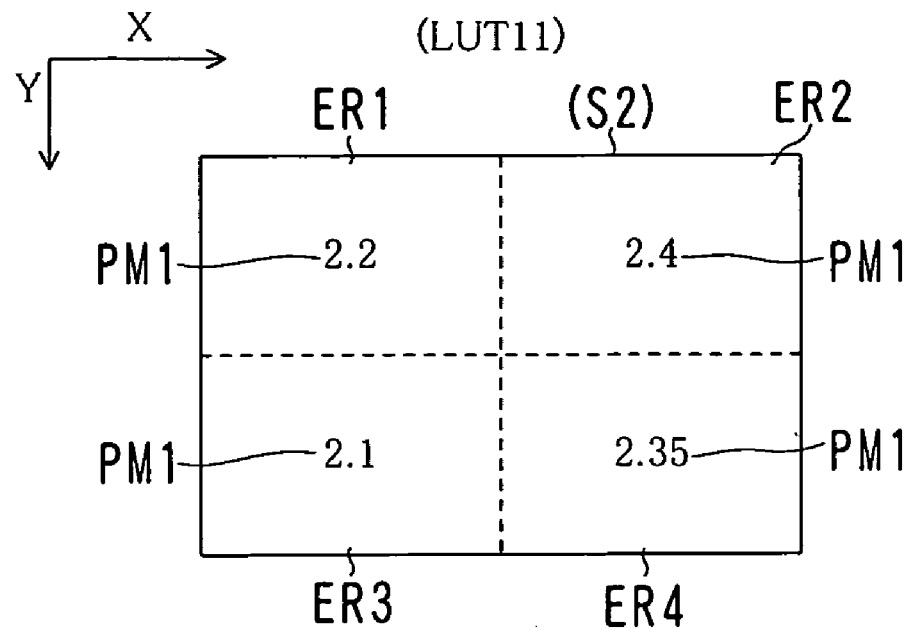
FIG. 6 shows an example of a specific value of a parameter for each area.
Figure 7:
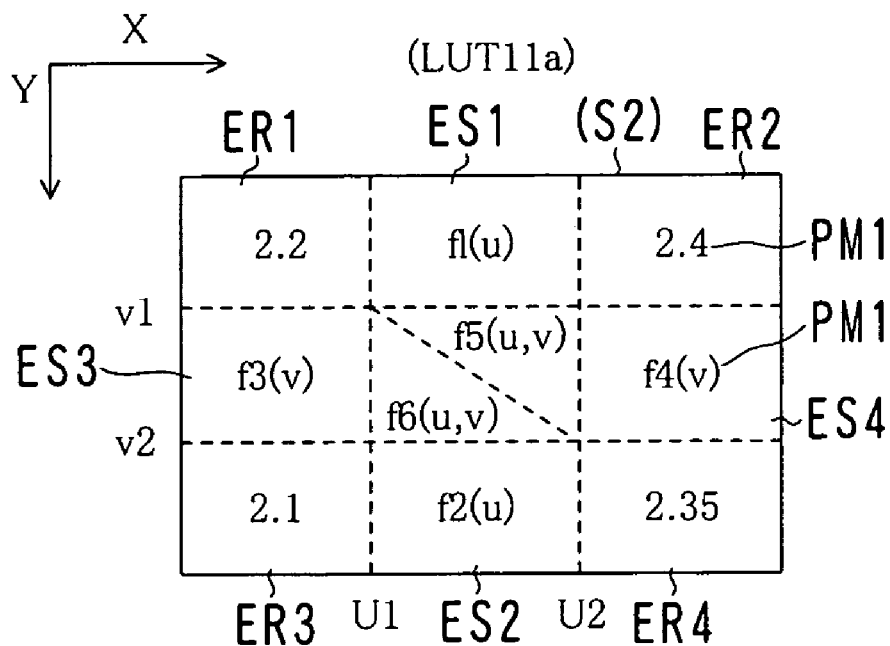
FIG. 7 shows another example of a specific value of a parameter for each area.
Figure 8:
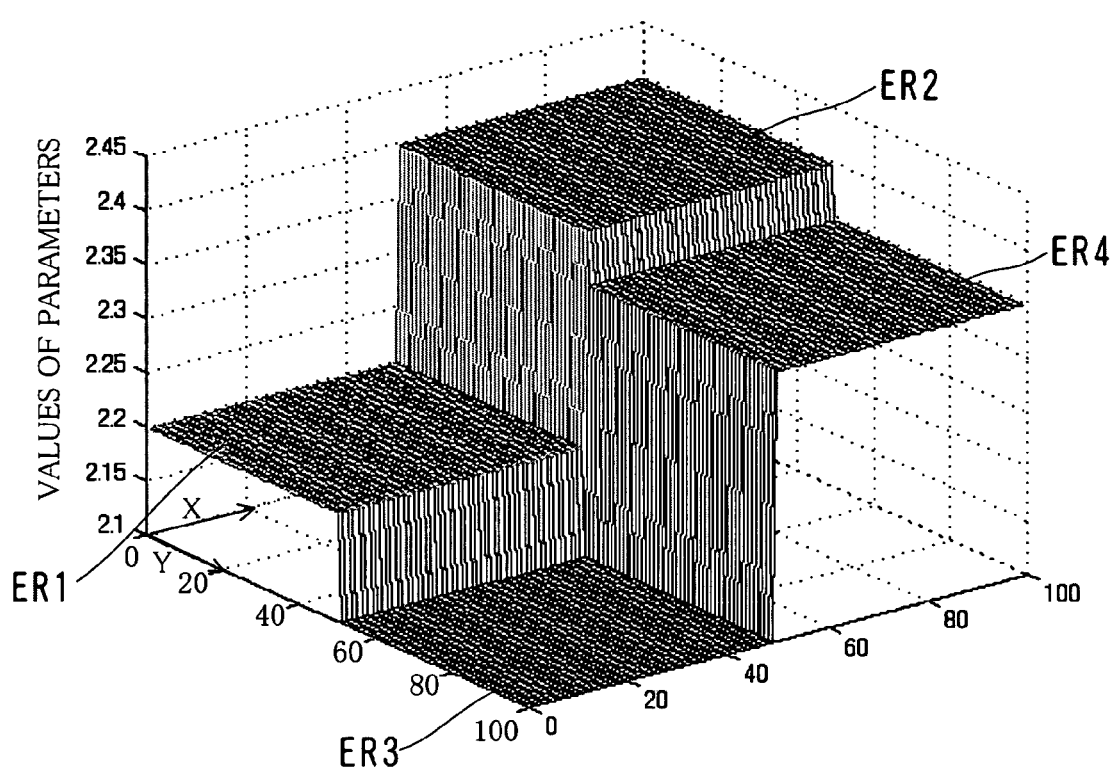
FIG. 8 shows a graph of values of the parameters corresponding to FIG. 6.
Figure 9:
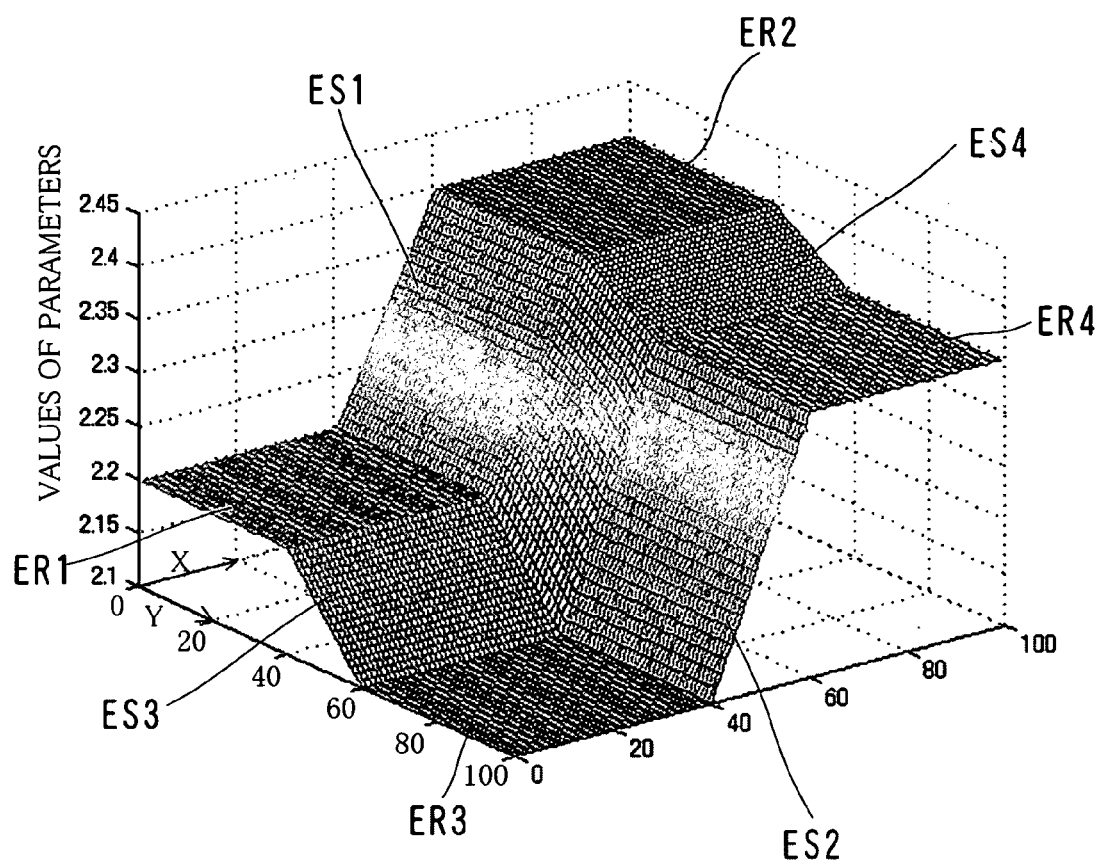
FIG. 9 shows a graph of values of the parameters corresponding to FIG. 7.

FIGS. 4(a)-4(d) show examples of division of the imaging surface S2 of the image sensor 53, FIG. 5 shows an example of contents of a memory 61M of the system controller 61, FIG. 6 shows an example of a specific value of a parameter for each area ER, FIG. 7 shows another example of a specific value of a parameter for each area ER, FIG. 8 shows a graph of values of the parameters corresponding to FIG. 6, and FIG. 9 shows a graph of values of the parameters corresponding to FIG. 7.

In an example shown in FIG. 4(a), the imaging surface S2 is divided into four areas ER1-ER4 having the same size. In an example shown in FIG. 4(b), the imaging surface S2 is divided into four areas ER1-ER4 having the same size, and interpolation areas ES1-ES6 are provided so that values of the parameters are continuous at boundaries of the sectioned areas ER1-ER4 as being described later. The areas ER1-ER4 become smaller because of the generated interpolation areas ES1-ES6.

In the example shown in FIG. 4(c), the imaging surface S2 is divided into six areas ER1-ER6 having the same size. In the example shown in FIG. 4(d), the imaging surface S2 is divided into nine areas ER1-ER9 having the same size. In these examples too, the interpolation areas ES may be added as described above.

Note that although the imaging surface S2 is divided into plural areas ER having the same size in these examples, the areas ER may have different sizes. For example, it is possible to divide so that peripheral areas have a smaller size relatively. In addition, it is possible to divide into two areas ER, three areas ER, or ten or more areas ER.

In this way, the imaging surface S2 of the image sensor 53 is divided into plural areas ER in order to compute the three-dimensional coordinates corresponding to each pixel in accordance with the measured data of each pixel by using a parameter to be applied to each area ER to which each pixel belongs. Therefore, the parameter to be applied to each area ER is stored in the memory 61M of the system controller 61. As the memory 61M, a nonvolatile memory or a memory with battery backup can be used.

Note that the function of dividing the imaging surface S2 into plural areas ER or interpolation areas ES is included in the system controller 61. Namely, the system controller 61 sends the area division information to the output process circuit 62 in cooperation with control of the driver 55 for driving the image sensor 53, for example. The area division information is information that indicates the areas ER1-ER4 and the interpolation areas ES1-ES6 as shown in FIGS. 4(*a*)-4(*d*), 6 and 7 for the measured data Ds of each pixel, for example. In addition, it is possible to divide a storage area of each pixel of the measured data Ds for each of the areas ER1-ER4 and the interpolation areas ES1-ES6.

As shown in FIG. 5, the memory 61M stores a lot of look-up tables LUT11, LUT12, LUT13 . . . . These look-up tables LUT store values or computing equations of parameters that are used for computing the three-dimensional shape (including shooting condition data and other data). Namely, the look-up table LUT stores values of various parameters including a camera parameter and a light projecting optical system parameter in the form of table. In addition, each of the look-up tables LUT stores a value of a parameter to be applied to each sectioned area ER on the imaging surface S2 and a computing equation or a value of a parameter to be applied to each interpolation area ES. When the host computer 3 computes the three-dimensional coordinates, it uses an optimal parameter for each area ER and applies a camera sight line equation and a detection light plane equation.

FIG. 6 shows an example of values of parameters to be applied to the sectioned areas ER1-ER4 concerning a certain parameter PM1 when the imaging surface S2 is divided into the four areas ER1-ER4 as shown in FIG. 4(*a*). According to this example, values "2.2", "2.4", "2.1" and "2.35" are used as values of a certain parameter PM1 for the areas ER1-ER4, respectively. Thus, the memory 61M stores relationships between the areas ER1-ER4 and values of parameters as the look-up tables LUT for types of parameters.

Appropriate values of parameters in each area ER are determined by actual measurement for each three-dimensional camera 2, so that optimal values are determined for each area ER in an experimental manner. The actual measurement itself for determining values of parameters can be performed by a conventionally known method. One of characteristics of this embodiment is that the imaging surface S2 is divided into plural areas ER, and values of optimal parameters are determined by real measurement for each area ER. Namely, in the conventional method, the imaging surface S2 is not divided into areas ER, and only one value is used for one parameter regardless of an area of the imaging surface S2.

Note that when determining a value of each parameter for each area ER in this embodiment, actual measurement is performed for plural sampling points in each area ER, and various mathematical or statistical methods including a simple average, an average root-mean-square, a weighted average and a least square method can be applied in accordance with the obtained plural values.

FIG. 7 shows an example of values or of computing equations of parameters to be applied to the areas ER1-ER4 and the interpolation areas ES1-ES6 provided to the imaging surface S2 as shown in FIG. 4(*b*) for the same parameter PM1 as in FIG. 6. In FIG. 7, u1 and u2 denote pixel positions at both ends in the horizontal direction in the interpolation areas ES1 and ES2, while v1 and v2 denote pixel positions at both ends in the vertical direction in the interpolation areas ES3 and ES4.

According to this example, the same values as the case shown in FIG. 6 are used for the areas ER1-ER4, while f1(*u*), f2(*u*), f3(*v*), f4(*v*), f5(*u*,*v*) and f6(*u*,*v*) are used for the interpolation areas ES1-ES6.

For example, f1(*u*) and f3(*v*) can be expressed as follows.

$$f1(u)=2.2+a1(u-u1)$$

$$f3(v)=2.2+a3(v-v1)$$

Here, u or v denotes a pixel position in the horizontal direction or in the vertical direction on the imaging surface S2, while a1 and a3 are coefficients that are determined in accordance with values of parameters in the area ER that is adjacent to the interpolation area ES. Here, a1=0.2/(u2−u1), and a3=−0.1/(v2−v1). Equations f5(*u*,v) and f6(*u*,v) are expressed by the plane equation that is defined by three points.

Thus, the memory 61M stores relationships between the areas ER1-ER4 as well as the interpolation areas ES1-ES6 and values or computing equations of the parameters as the look-up tables LUT for each type of the parameters. Note that it is possible to store a value of the pixel individually for the interpolation areas ES1-ES6 instead of the computing equation of the parameter.

In this way, the imaging surface S2 is divided into areas ER1-ER4, and interpolation areas ES1-ES6 are provided so that values of parameters become continuous. Thus, the three-dimensional coordinates of the sampling points can be determined more precisely.

FIG. 8 shows an example that is the same as the values of parameters shown in FIG. 6, in the form of a height distribution of parameter values for the area ER on the imaging surface S2 indicated by the XY coordinates. In FIG. 8, each of the X axis and the Y axis has a scale of 0-100. This can be considered there is an imaging surface S2 of 100×100 pixels, for example. Alternatively, it can be considered that pixel positions in the X direction and in the Y direction on the imaging surface S2 of Nx×Ny pixels are expressed on a percentage basis. For example, the imaging surface S2 of the image sensor 53 has 640×480 pixels in this embodiment.

FIG. 9 shows an example that is the same as the values and the computing equations of parameters shown in FIG. 7, in the form of a height distribution of parameter values for the area ER and the interpolation area ES on the imaging surface S2 indicated by the XY coordinates.

In this embodiment, there are following parameters that are necessary for computing the three-dimensional coordinates. Namely, there are an image distance b, distortion aberration parameters d1 and d2, a center pixel position u0 in the horizontal direction on the imaging surface, and a center pixel position v0 in the vertical direction as the camera parameter. There are a rotation angle the1 about the X axis, a slope angle the2 about the Y axis, a slope angle the3 about the Z axis, a deflection angular velocity the4 (=ω) about the X axis, a base line length L, a position error "a" along the X axis and an offset s of a base point A (=doff) as the light projecting optical system parameter. Note that a specific example of a range of the parameter value will be shown in Table 1 later.

After the measured data corresponding to each pixel are generated and are stored in the memory 63, an operator issues instruction to an output of data. Then, the measured data are delivered on line in a predetermined form by a SCSI controller 66 or an NTSC conversion circuit 65 or are stored in the recording medium 4. On this occasion, parameters stored in the memory 61M are also delivered together with the measured data.

The on-line output of the measured data is performed via the analog output terminal 31 or the digital output terminal 33. The imaging information of the color image sensor 54 is transmitted to a color processing circuit 67 in synchronization with a clock from a driver 56. The imaging information after the color process is delivered on line via an NTSC conversion circuit 70 and the analog output terminal 32 or is digitized by a digital image generating portion 68 so as to be stored in a color image memory 69. After that, the color image data are transmitted from the color image memory 69 to the SCSI controller 66, are delivered from the digital output terminal 33 on line, or are stored in connection with the measured data in the recording medium 4. Note that the color image is an image having an angle of view that is the same as a distance image obtained by the image sensor 53 and is used as reference information when the host computer 3 performs an application process. As an example of the process using the color information, there is a process for generating a three-dimensional shape model by combining plural sets of measured data having different camera eye points or a process for thinning unnecessary vertexes from a three-dimensional shape model.

The system controller 61 gives instruction to a character generator 71 for displaying appropriate characters and symbols on the screen of the LCD 21. In addition, the memory 63 can deliver its memorized information to the system controller 61.

Figure 10:
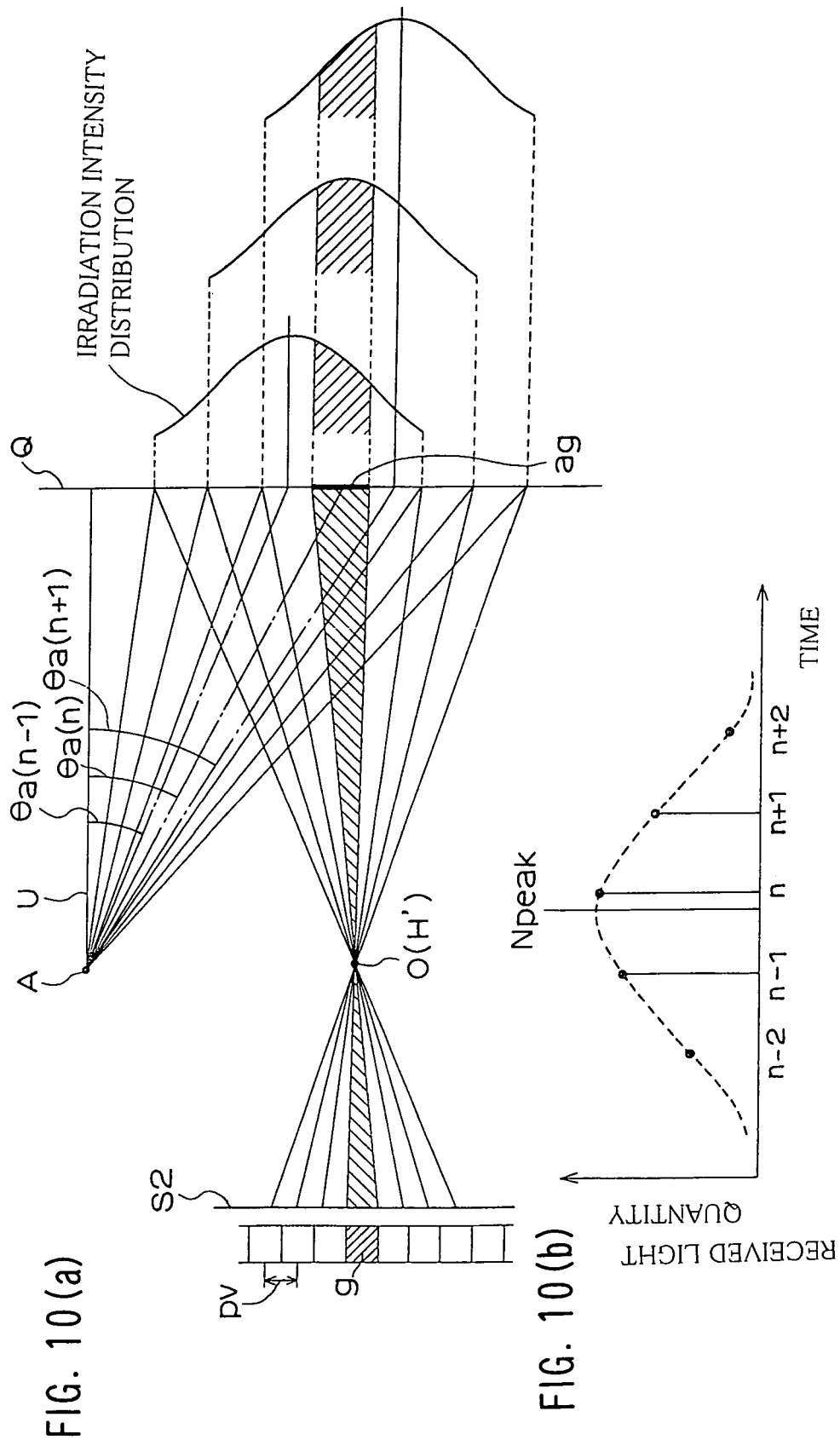
FIGS. 10(a) and 10(b) show a principle for calculating a three-dimensional position by the measuring system.

FIGS. 10(a) and 10(b) show a principle for calculating a three-dimensional position by the measuring system 1. In FIGS. 10(a) and 10(b), the same reference symbols denote the same elements as in FIGS. 18(a)-18(d) and 19(a)-19(c) for easy understanding.

The slit light U having relatively large width is projected onto the object Q so that it covers plural pixels on the imaging surface S2 of the image sensor 53. More specifically, the width of the slit light U is set to a value corresponding to five pixels. The slit light U is deflected downward so as to move by one pixel pitch pv on the imaging surface S2 every sampling period, thereby the object Q is scanned. The image sensor 53 produces photoelectric conversion information of one frame every sampling period.

Noting one pixel g on the imaging surface S2, effective received light data are obtained in five times of sampling among N times of sampling that are performed during the scanning period. A timing when the optical axis of the slit light U passes an object surface ag in a range viewed by the target pixel g (a temporal barycenter Npeak: time when the received light quantity of the target pixel g becomes the maximum) is determined by interpolation operation on the received light data of the five times. In the example shown in FIG. 10(b), the received light quantity becomes the maximum at the timing between the n-th and the previous (n−1)th times. A position (coordinates) of the object Q is calculated in accordance with a relationship between the direction of projecting the slit light and an incident direction of the slit light on the target pixel g at the determined timing. Thus, measurement of a resolution higher than the resolution defined by the pixel pitch pv on the imaging surface can be realized.

In the measuring system 1 of this embodiment, the three-dimensional camera 2 delivers the received light data of the image sensor 53 of five times per pixel g as measured data to the host computer 3, and the host computer 3 calculates coordinates of the object Q in accordance with the measured data. The output process circuit 62 performs the generation of the measured data corresponding to each pixel g in the three-dimensional camera 2.

Note that U.S. Pat. No. 6,141,105 mentioned before can be referred for a detailed structure of the output process circuit 62 and the memory 63 and a read range of the image sensor 53.

Next, operations of the three-dimensional camera 2 and the host computer 3 will be described along with the procedure of measurement. Hereinafter, the number of sampling points in the measurement is regarded as 244×256. Namely, the substantial number of frames N is 244, while the number of pixels in the slit lengthwise direction on the imaging surface S2 is 256.

The user determines a position and an orientation of the camera by viewing a color monitor image displayed on the LCD 21 and sets the angle of view. If necessary, the user performs a zooming operation. The three-dimensional camera 2 does not perform aperture adjustment for the color image sensor 54, and an electronic shutter function is used for exposure control so as to display a color monitor image. The aperture is set to an opened state so that light quantity to be received by the image sensor 53 becomes as much as possible.

Figure 11:
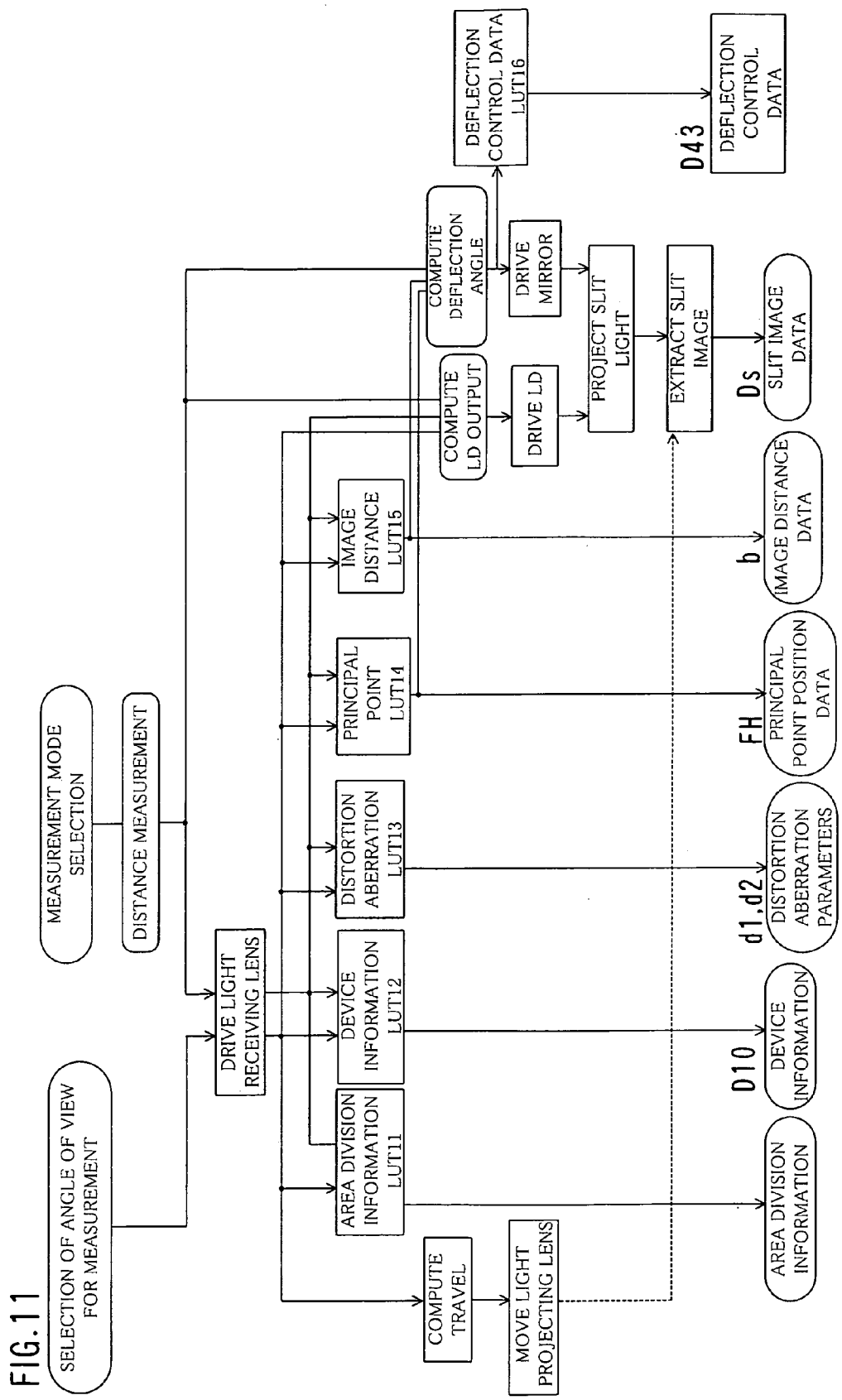
FIG. 11 shows a flow of data in the three-dimensional camera.
Figure 12:
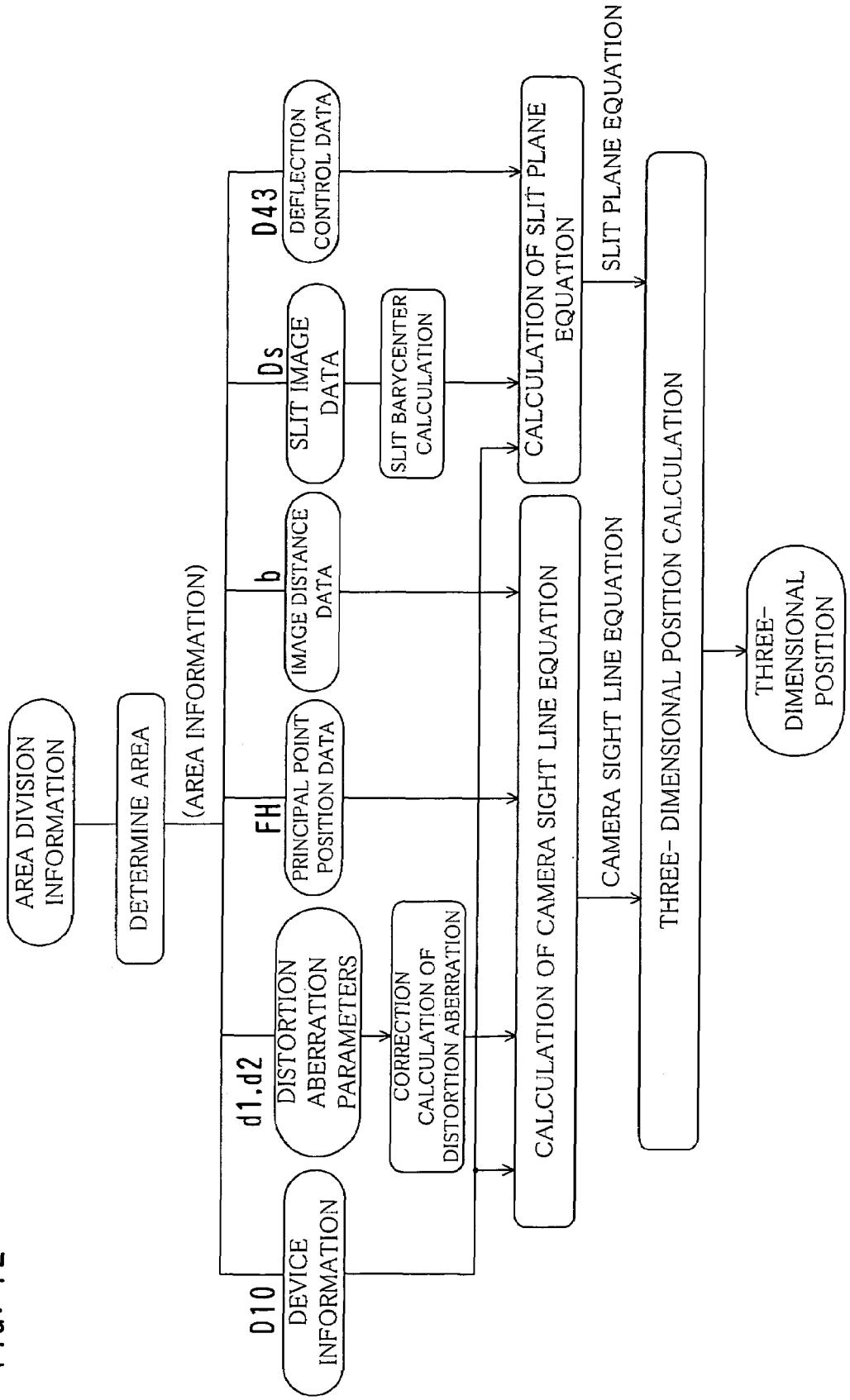
FIG. 12 shows a flow of data in a host computer.
Figure 13:
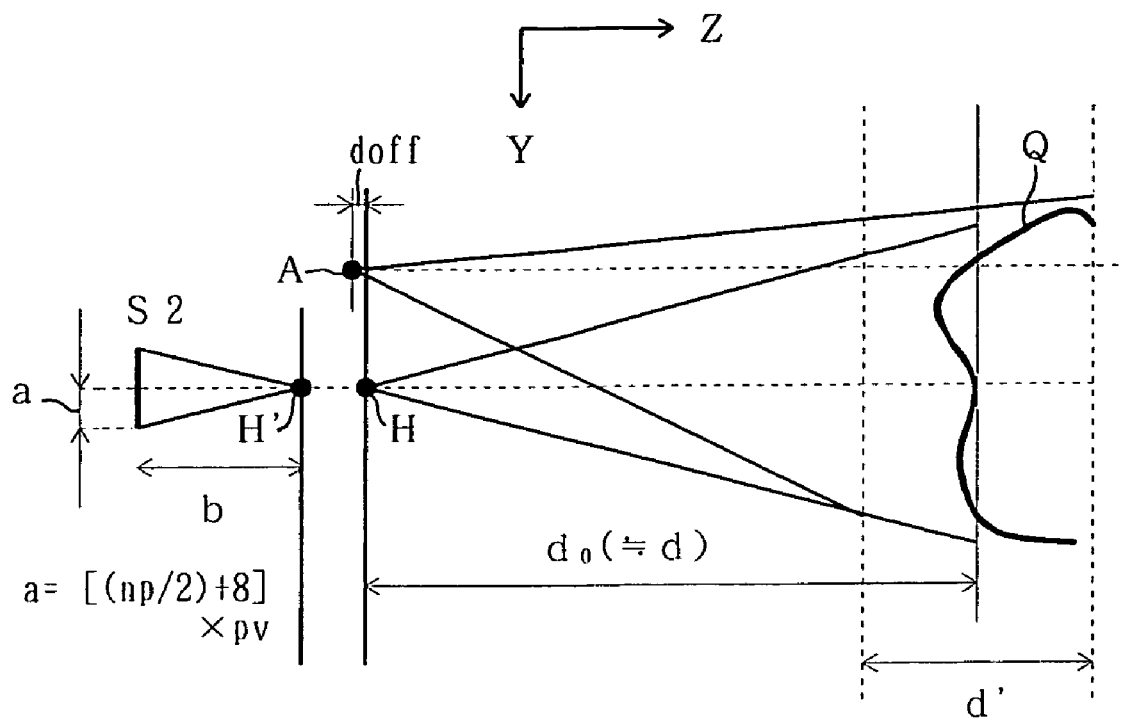
FIG. 13 shows a position relationship between points of an optical system and an object.

FIG. 11 shows a flow of data in the three-dimensional camera 2, FIG. 12 shows a flow of data in the host computer 3, and FIG. 13 shows a position relationship between points of the optical system and the object Q.

In FIG. 11, responding to the user's operation for selecting the angle of view, i.e., a zooming operation, a variator portion of the zoom unit 51 moves, and a focusing operation is performed by movement of a focusing portion. During the focusing operation, a distance d0 to the object is roughly measured. Responding to this lens drive of the light receiving system, a travel of a variator lens on the light projecting side is computed, and the movement of the variator lens is controlled in accordance with a result of the computation. The lens control on the light projecting side is for the image sensor 53 to receive the slit light U of the width corresponding to five pixels regardless of a shooting distance and the angle of view.

The system controller 61 reads an encoder output of the focus driving system 59 (turn out quantity Ed) and an encoder output of the zoom driving system 60 (a zoom pitch value fp) via the lens controller 58. Inside the system controller 61, the distortion aberration table LUT13, the principal point position table LUT14 and the image distance table LUT15 are referred so that the shooting condition data that are parameters corresponding to the turn out quantity Ed and the zoom pitch value fp are delivered to the host computer 3. Here, the shooting condition data are distortion aberration parameters (lens distortion correction coefficients d1 and d2), a front principal point position FH and the image distance b. The front principal point position FH is expressed by a distance between a front end point F and a front principal point H of the zoom unit 51 (see FIG. 19(c)). As the front end point F is fixed, the front principal point H can be specified by the front principal point position FH.

Simultaneously, the area division information is read out of the area division information table LUT11, and device information is read out of the device information table LUT12. Each of them is delivered to the host computer 3.

In addition, the system controller 61 performs preliminary measurement by projecting the slit light U in a specific direction for measuring a measurement environment, determines the distance d to the object in accordance with shooting information obtained by the preliminary measurement, resets the turn out quantity Ed in accordance with the distance d to the object so as to drive the lens, and sets operation for real measurement. Set items include a power of the semiconductor laser 41 (a laser beam intensity), a condition for deflecting the slit light U (a projection start angle, a projection end angle, and a deflection angular velocity). When the distance d to the object is calculated, it is necessary to consider an offset doff in the Z direction between the front principal point H of the light receiving system that is a reference point for measuring a distance and the starting point A of the emitted light. When the deflection condition is calculated, it is necessary to perform an over scan by a predetermined quantity (corresponding to 8 pixels, for example) so as to secure a measurable distance range d' at the end portion in the scanning direction in the same manner as the middle portion. The projection start angle th1, the projection end angle th2 and the deflection angular velocity ω are expressed by the following equations.

$$th1 = \tan^{-1}((\beta \times pv(np/2+8)+L)/(d+doff)) \times 180/\pi$$

$$th2 = \tan^{-1}(-(\beta \times pv(np/2+8)+L)/(d+doff)) \times 180/\pi$$

$$\omega = (th1 - th2)/np$$

β: imaging magnification (=d/effective focal distance Freal)
pv: pixel pitch
np: effective number of pixels in the Y direction on the imaging surface S2
L: base line length The real measurement is performed under the condition obtained by the calculation described above. The object Q is scanned, and the measured data (slit image data) Ds corresponding to five frames per pixel obtained by the output process circuit 62 are sent to the host computer 3. Simultaneously, the deflection condition (the deflection control data D43) and device information D10 indicating a specification of the image sensor 53 are sent to the host computer 3. Table 1 shows main data that are sent from the three-dimensional camera 2 to the host computer 3.

TABLE 1

| DATA CONTENTS | DATA RANGE |
|---|---|
| MEASURED DATA | |
| BANK F (FRAME NUMBER) 244 × 256 × 8 bit | 0-255 |
| BANK A (n + 2) 244 × 256 × 8 bit | 0-255 |
| BANK B (n + 1) 244 × 256 × 8 bit | 0-255 |
| BANK C (n) 244 × 256 × 8 bit | 0-255 |
| BANK D (n − 1) 244 × 256 × 8 bit | 0-255 |
| BANK E (n − 2) 244 × 256 × 8 bit | 0-255 |
| SHOOTING CONDITION | |
| IMAGE DISTANCE b | 0.000-200.000 |
| FRONT PRINCIPAL POINT POSITION FH | 0.00-300.00 |
| PROJECTION START ANGLE th1 | |
| DEFLECTION ANGULAR VELOCITY ω | |
| DEVICE INFORMATION | |
| THE NUMBER OF PIXELS FOR MEASUREMENT (THE NUMBER OF SAMPLING POINTS IN X AND Y DIRECTIONS) | 1- |
| SENSOR PIXEL PITCH p u, p v | −0.00516- |
| POSTURE OF LIGHT PROJECTING SYSTEM (ABOUT X, Y, AND Z AXES) | 0.00-±90.00 |
| POSITION OF LIGHT PROJECTING SYSTEM (IN X, Y, AND Z AXES DIRECTIONS) | 0.00-±300.00 |
| LENS DISTORTION ABERRATION CORRECTION PARAMETER d 1, d 2 | |
| SENSPR CENTER PIXEL u 0, v 0 | 0.00-256.00 |
| TWO-DIMENSIONAL IMAGE | |
| R PLANE 512 × 512 × 8 bit | 0-255 |
| G PLANE 512 × 512 × 8 bit | 0-255 |
| B PLANE 512 × 512 × 8 bit | 0-255 |

When setting the projection start angle th1 and the projection end angle th2, the following equations may be applied instead of the above equations so that the measurable distance range can be shifted in the optical axis direction.

$$th1 = \tan^{-1}((\beta \times pv(np/2+8+\text{pitchoff})+L)/(d+doff)) \times 180/\pi$$

$$th2 = \tan^{-1}(-(\beta \times pv(np/2+8+\text{pitchoff})+L)/(d+doff)) \times 180/\pi$$

pitchoff: shift quantity of the measurable distance range

If the reference position for calculating a distance to the object is set to the close position of the object (the three-dimensional camera 2 side) and the measurable distance range d' is set so as to include the close position as being described later, the measurable distance range at the front side (the three-dimensional camera 2 side) usually becomes waste. Therefore, it is desirable to set the shift quantity pitchoff to be 25% at the front side and 75% at the rear side so that the measurable distance range d' is shifted to the rear side.

If the effective light reception area Ae has a width corresponding to 32 pixels, i.e., if the CCD area sensor has a width corresponding to 32 lines like this embodiment, the measurable distance range of the above-mentioned ratio is set when the shift quantity pitchoff is The host computer 3 computes the three-dimensional coordinates of each sampling point in accordance with the measured data Ds received from the three-dimensional camera 2.

As shown in FIG. 12, it is determined first which area ER the measured data Ds belong to in accordance with the area division information that is attached to the received measured data Ds. A parameter to be applied is extracted from the look-up tables LUT in accordance with the information that indicates the determined area ER (area information). A slit barycenter calculation, a correction calculation of the distortion aberration, a calculation of the camera sight line equation, a calculation of a slit plane equation and a three-dimensional position calculation are performed by using the extracted parameter, so that the three-dimensional positions (coordinates X, Y and Z) are determined for 244×256 sampling points. The sampling point is an intersection of a camera sight line (a straight line linking the sampling point and the front principal point H) and a slit plane (an optical axis plane of the slit light U that projects the sampling point).

The temporal barycenter Npeak (see FIG. 10) of the slit light U is given by the equation (4) below by using received light data Dg(i) at each sampling timing.

$$N\text{peak} = n + \Delta n \quad (4)$$

$$\Delta n = (-2 \times Dg(n-2) - Dg(n-1) + Dg(n+1) + 2 \times Dg(n+2))/\Sigma Dg(i)$$

$$(i = n-2, n-1, n, n+1, n+2)$$

or $$\Delta n = (-2 \times (Dg(n-2) - \min Dg(i)) - (Dg(n-1) - \min Dg(i)) + (Dg(n+1) - \min Dg(i)) + 2 \times (Dg(n+2) - \min Dg(i)))/\Sigma Dg(i)$$

Influence of ambient light can be reduced by determining a weighted average after subtracting the minimum data minDg (i) among five received light data.

The camera sight line equation is defined by the equations (5) and (6) below.

$$(u - u0) = (xp) = (b/pu) \times (X/(Z-FH)) \quad (5)$$

$$(v - v0) = (yp) = (b/pv) \times (Y/(Z-FH)) \quad (6)$$

b: image distance

FH: front principal point position pu: pixel pitch in the horizontal direction on the imaging surface pv: pixel pitch in the vertical direction on the imaging surface u: pixel position in the horizontal direction on the imaging surface u0: center pixel position in the horizontal direction on the imaging surface v: pixel position in the vertical direction on the imaging surface v0: center pixel position in the vertical direction on the imaging surface In addition, the slit plane equation is defined by the equation (7) below.

$$(X-a, Y-L, Z-s) \times R \times (0,1,0)^t = 0 \quad (7)$$

a: error along the X axis

L: base line length s: offset of the base point A (=doff)

Here, the determinant R is defined by the (8) below.

$$\begin{bmatrix} \cos(the3) & -\sin(the3) & 0 \\ \sin(the3) & \cos(the3) & 0 \\ 0 & 0 & 1 \end{bmatrix} \cdot \begin{bmatrix} \cos(the2) & 0 & \sin(the2) \\ 0 & 1 & 0 \\ -\sin(the2) & 0 & \cos(the2) \end{bmatrix} \cdot \begin{bmatrix} 1 & 0 & 0 \\ 0 & \cos(the1 + the4 \cdot nop) & -\sin(the1 + the4 \cdot nop) \\ 0 & \sin(the1 + the4 \cdot nop) & \cos(the1 + the4 \cdot nop) \end{bmatrix} \quad (8)$$

the1: X rotation angle about the X axis the2: Y slope angle about the Y axis the3: Z slope angle about the Z AXIS the4: X argular velocity about the X axis nop: slit transit time=temporal barycenter Npeak The camera sight line equation and the slit plane equation (the detection light plane equation) defined by the equations (5), (6) and (7) are solved so that the three-dimensional coordinates (X, Y, Z) corresponding to pixels indicated by coordinates (u, v) on the imaging surface S2 are calculated.

Then, the calculation is performed by using a parameter corresponding to the area ER to which each pixel belongs when applying the equations (5), (6) and (7).

A geometrical aberration depends on the angle of view. The distortion is generated substantially in a symmetric manner around the center pixel. Therefore, the distortion quantity is defined by a function of a distance from the center pixel. Here, an approximation is made by a cubic function of the distance. A quadratic correction coefficient is represented by d1, and a cubic correction coefficient is represented by d2. Namely, the pixel positions u' and V' after the correction in the light receiving system are given by the equations (9) and (10) below.

$$u' = u0 + d1 \times t2^2 \times (u-u0) + d2 \times t2^3 \times (u-u0) \quad (9)$$

$$v' = v0 + d1 \times t2^2 \times (v-v0) + d2 \times t2^3 \times (v-v0) \quad (10)$$

Here, $t2 = (t1)^{1/2}$ $t1 = ((u-u0) \times pu)^2 + ((v-v0) \times pv)^2$

If u is replaced with u' and v is replaced with v' in the above equations (5) and (6), the three-dimensional position in which the distortion aberration is taken into account can be determined.

Note that although it is described that the parameter extracted from the memory 61M of the three-dimensional camera 2 is transmitted to the host computer 3 with reference to FIGS. 11 and 12, but this structure should not be considered to be a limitation. Namely, it is possible, for example, to transmit all the look-up tables LUT stored in the memory 61M when transmitting the measured data Ds from the three-dimensional camera 2, so that the host computer 3 can store the look-up tables LUT and extract a necessary parameter. In addition, it is possible to install the look-up table LUT that is the same as that of the three-dimensional camera 2 in the host computer 3 from the beginning. As means for storing the parameter PM for that purpose, an appropriate memory embedded in the CPU 3a or an external one can be used.

Note that detailed description about the calibration can be seen in "Geometrical correction of an image without positioning a camera", Onodera and Kanatani, Workshop document of Institute of Electronics, Information and Communication Engineers of Japan, PRU91-113 or "High accuracy calibration method of a range finder in accordance with a three-dimensional model in an optical system", Ueshiba, Yoshimi and Oshima, Papers of Institute of Electronics, Information and Communication Engineers of Japan, D-II vol. J74-D-II, No. 9, pp. 1227-1235, September '91.

Next, a flow of a process for obtaining a parameter and a process for calculating three-dimensional coordinates by using the parameter in the measuring system 1 will be described with reference to flowcharts.

Figure 14:
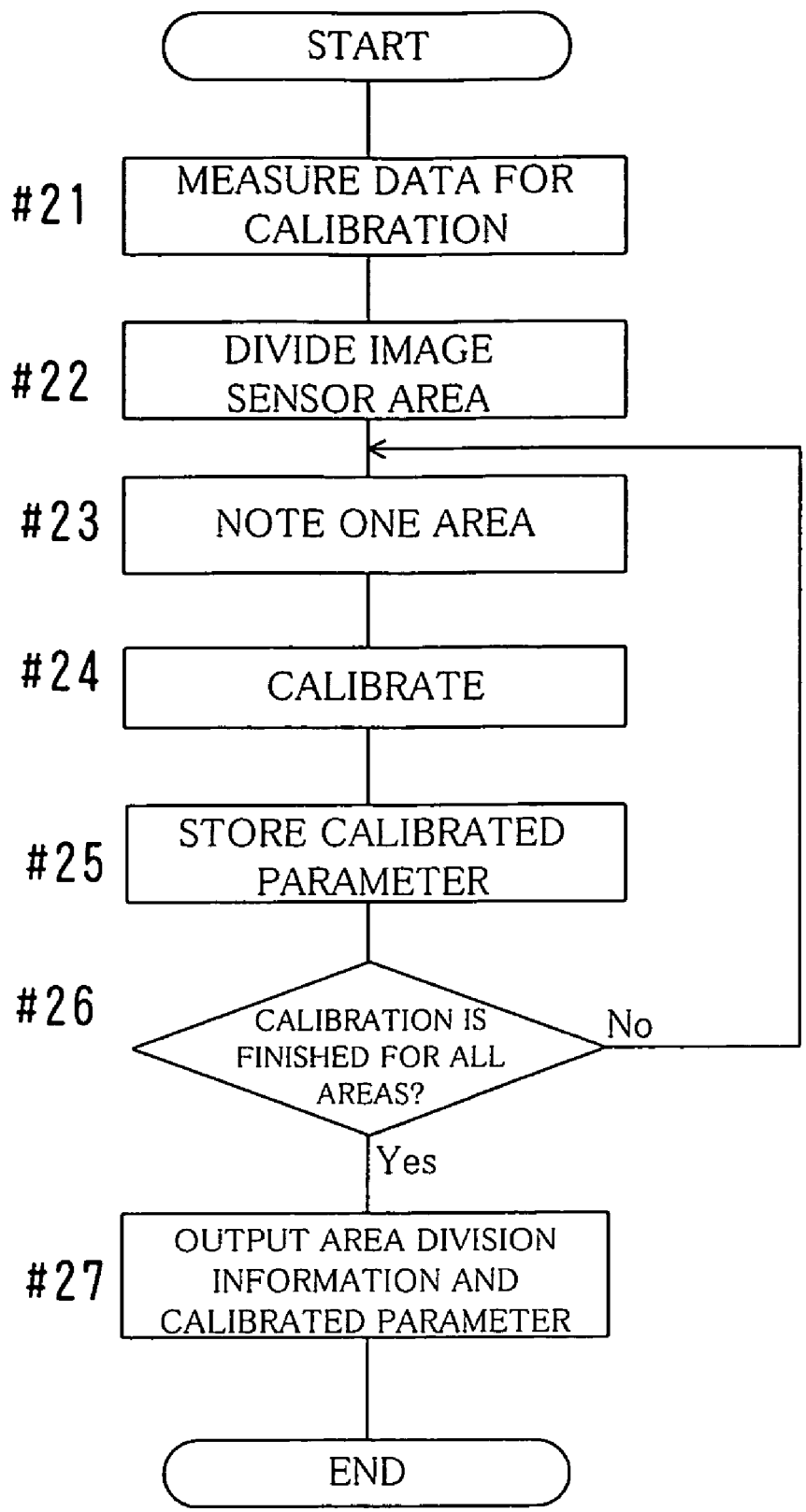
FIG. 14 is a flowchart showing a flow of a process for obtaining the parameter.
Figure 15:
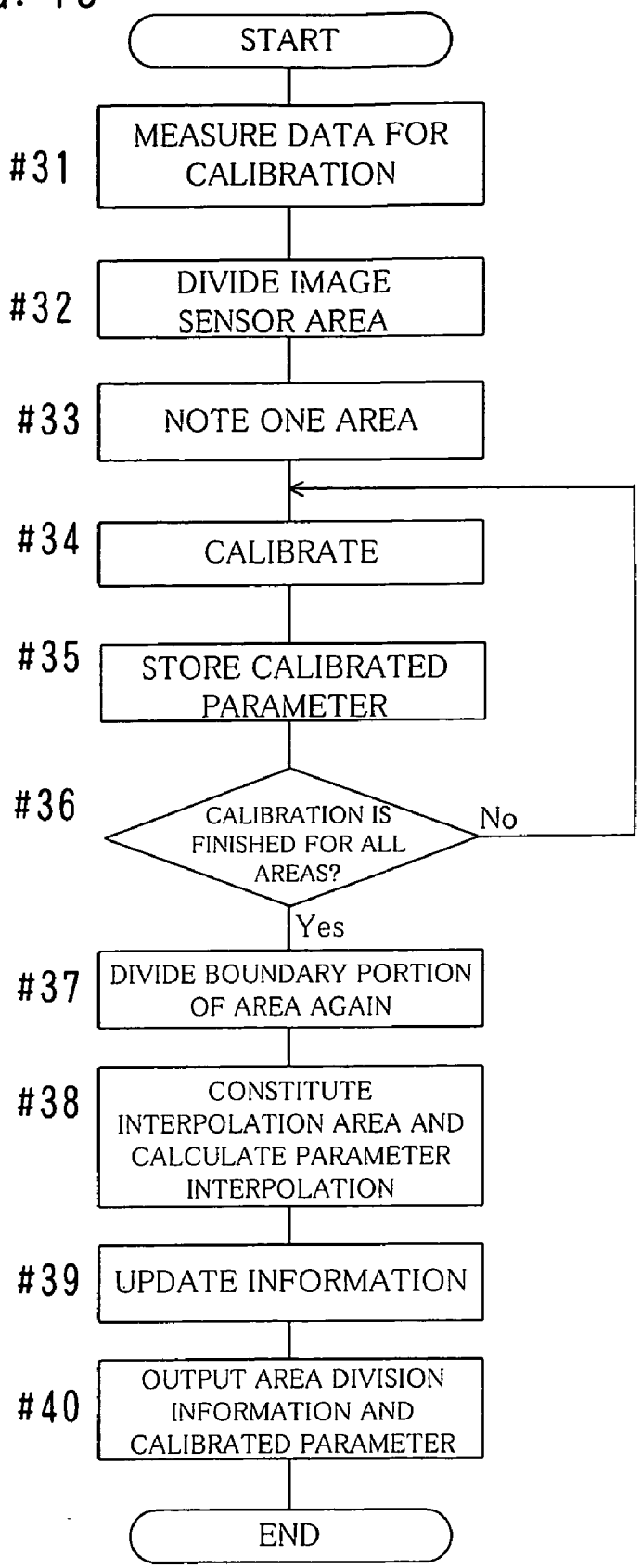
FIG. 15 is a flowchart showing a flow of a process when an interpolation area is provided.
Figure 16:
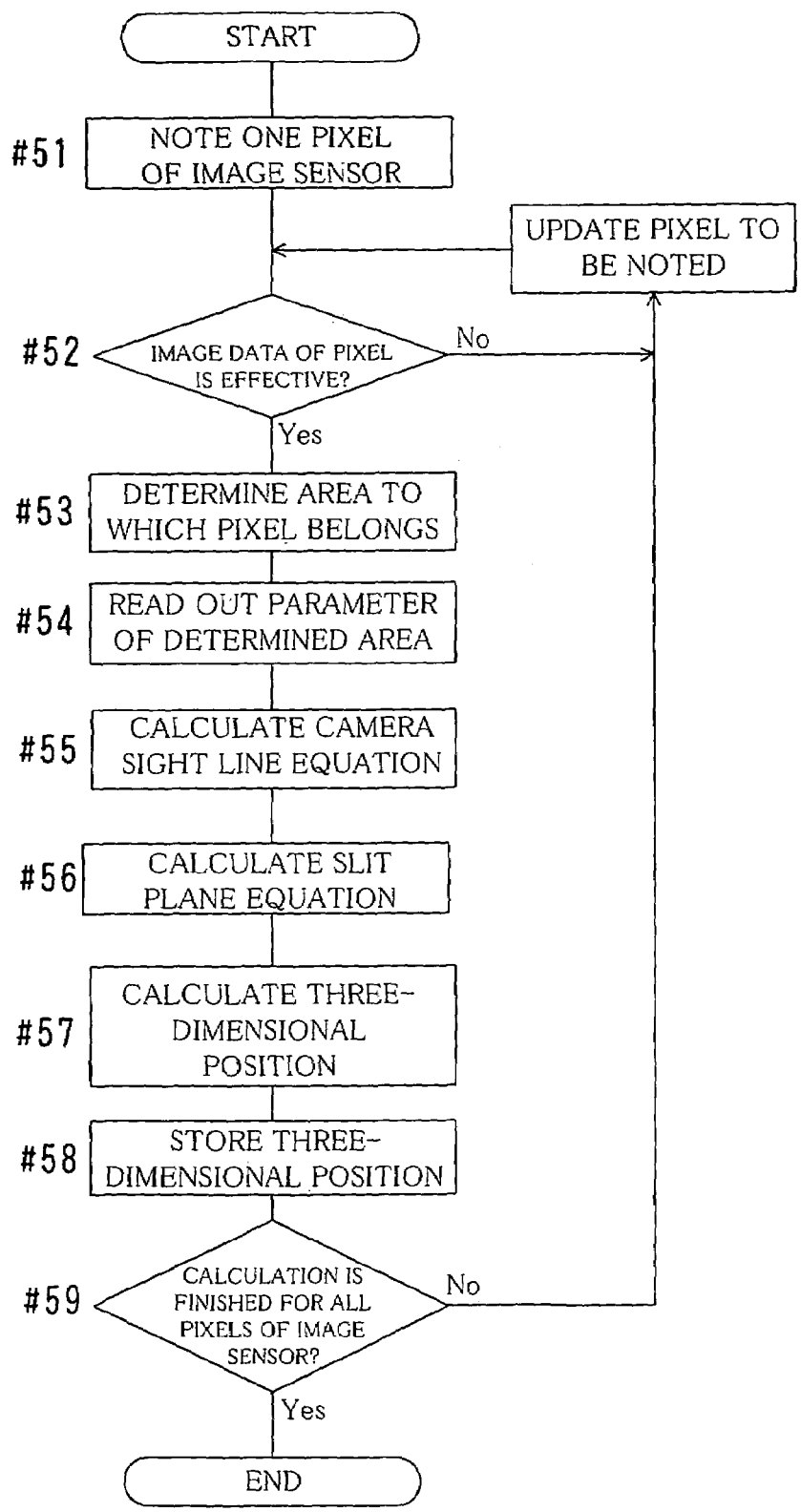
FIG. 16 is a flowchart showing a flow of a process for computing three-dimensional coordinates.

FIG. 14 is a flowchart showing a flow of a process for obtaining the parameter, FIG. 15 is a flowchart showing a flow of a process when an interpolation area ES is provided, and FIG. 16 is a flowchart showing a flow of a process for computing three-dimensional coordinates by the measuring system 1.

In FIG. 14, data for calibration are measured first (#21). The data for calibration are obtained by measuring an optical error, an electrical error and a mechanical error for each three-dimensional camera 2 as described above by various methods known conventionally. For example, an image of a known pattern arranged at a predetermined distance position is taken by the three-dimensional camera 2, and many data are obtained about which position the pattern is imaged on the imaging surface S2. In addition, slit light U is projected onto a wall that is arranged at a predetermined distance position, and a slit image data are obtained.

Next, the imaging surface S2 of the image sensor 53 is divided into plural areas ER (#22). Noting the sectioned one area ER (#23), a calibrated parameter is determined for the area ER (#24) and is stored in the memory temporarily (#25). This parameter is a value specified for each area ER as described above or a specific computing equation or the like. The corrected parameter has been determined for all areas ER (Yes in #26), the obtained parameter for each area ER and the area division information are produced (#27). The produced parameter and others are stored in the memory 61M of the three-dimensional camera 2.

In FIG. 15, the process in Steps #31-36 is the same as the process in Steps #21-26 in FIG. 14. In Step #37, the boundary portion of the area ER is divided again so that the interpolation area ES is provided. Then, a corrected parameter is determined for the interpolation area ES (#38), and the entire area division information and the parameter are updated by the determined parameter for the interpolation area ES (#39). The parameter and the area division information for each area ER and each interpolation area ES are produced (#40).

In FIG. 16, one pixel of the image sensor 53 is noted (#51). If the image data of the pixel are effective (Yes in #52), the area ER to which the pixel belongs is determined (#53). The value of the parameter of the determined area ER is read out of the memory 61M or the like (#54). The read parameter is used for calculating the camera sight line equation and the slit plane equation (#55 and #56), and the three-dimensional coordinates are determined (#57). The obtained three-dimensional coordinates are stored in the memory (#58). When the calculation of the three-dimensional coordinates is performed for all pixels of the image sensor 53, the process is finished (#59).

In addition, although various known processes other than what is described above can be performed in the measuring system 1, it is possible to refer to the U.S. Pat. No. 6,141,105 described above about the detail of them.

As described above, the measuring system 1 of this embodiment divides the imaging surface S2 of the image sensor 53 into plural areas ER, or further divides the same into interpolation areas ES, determines values or equations of a parameter that is suitable for each area, and uses a value or an equation of an optimal parameter for each area when calculating the three-dimensional coordinates. Therefore, the three-dimensional coordinates can be calculated precisely.

Figure 17A:
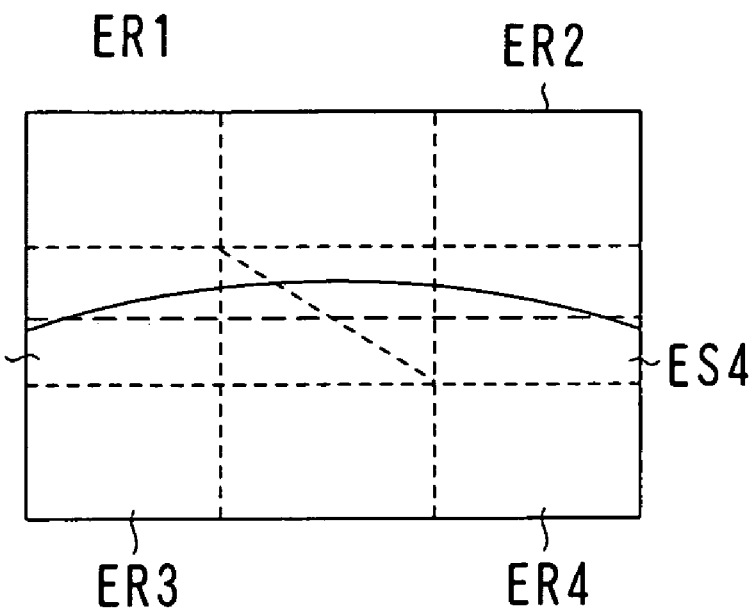
FIGS. 17(a) and 17(b) show examples of a slit image of a flat object.

For example, as shown in FIG. 17(a), the conventional system produces a curved slit image FS1 shown by the solid line for a flat object Q and processes it as a linear slit image FSj. Therefore, the difference between the two slit images FS1 and FSj becomes an error that causes decrease of accuracy of the three-dimensional coordinates.

Figure 17B:
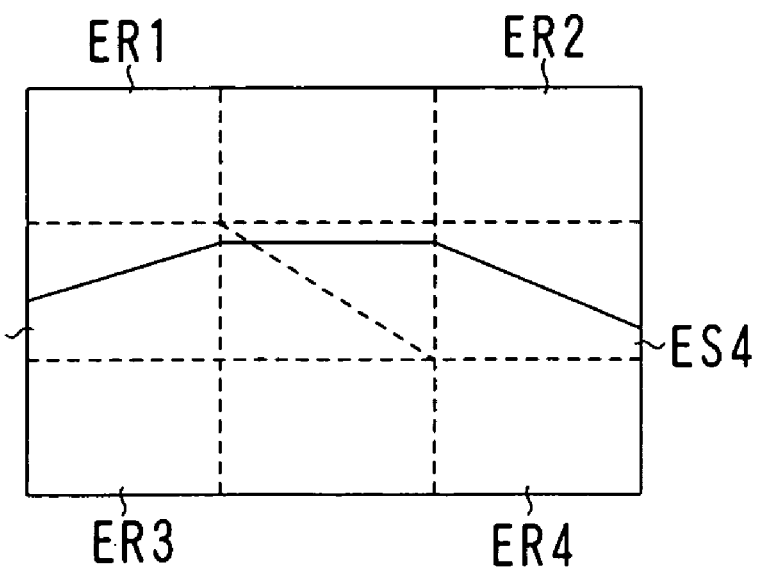
Figure 19A:
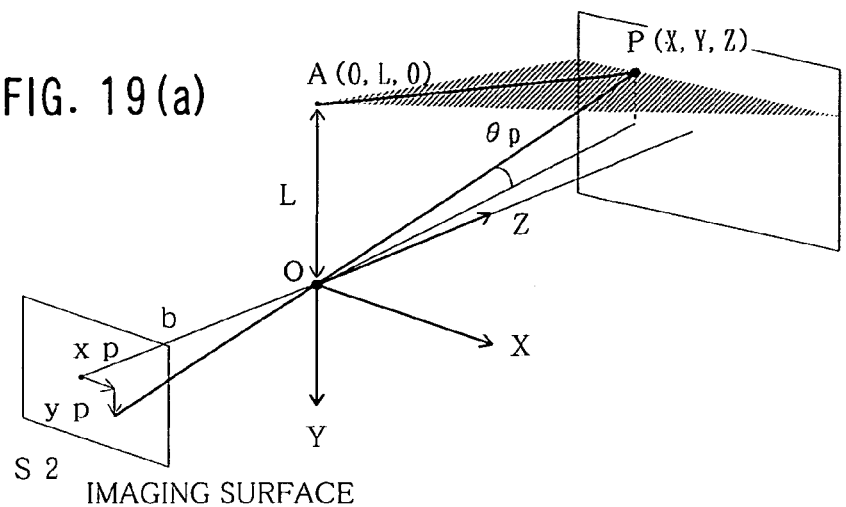
FIGS. 19(a)-19(c) show a principle of measurement by the slit light projection method.
Figure 19B:
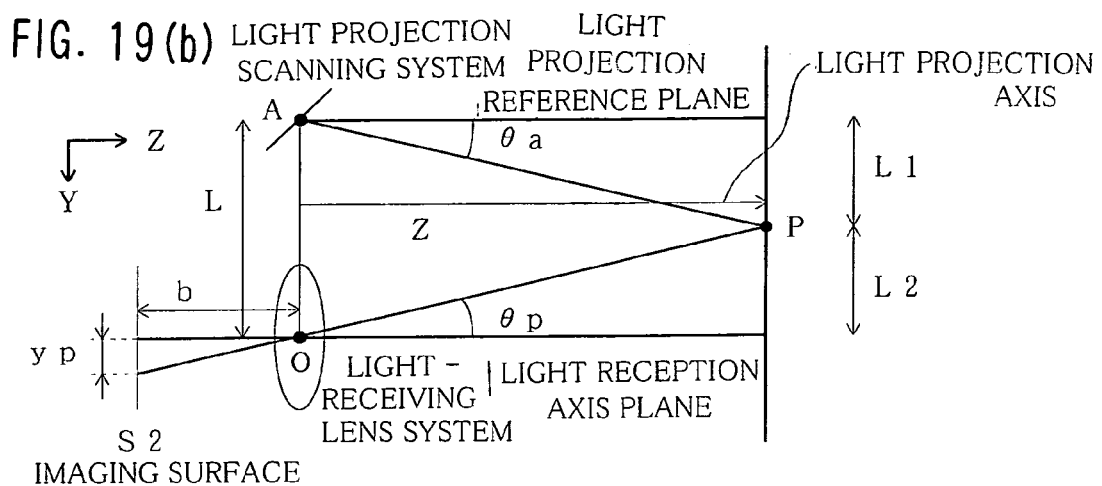
Figure 19C:
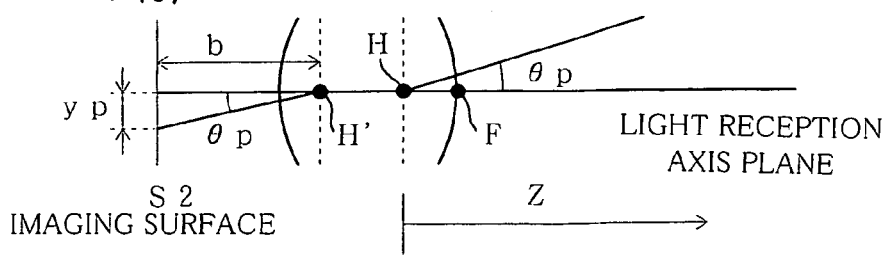

In contrast, the measuring system 1 of this embodiment uses the corrected parameter for each area as shown in FIG. 17(b), so that the process is performed for the flat object Q regarding a slit image FS2 that is similar to the real slit image FS1 is obtained. Namely, in FIG. 17(b) for example, the slit image FS2 is regarded as plural continuous lines each of which is a result of approximation for each area.

Therefore, bending of the slit light U, a shift of the axis of scanning optical system, nonlinearity of the deflection angular velocity to an instructed value or the like can be corrected, so that precise three-dimensional coordinates can be determined. Thus, a three-dimensional shape of an object can be measured and entered precisely.

In addition, the process of dividing the imaging surface S2 into plural areas and obtaining a parameter that is suitable for each area, the process for calculating three-dimensional coordinates using the parameter for each area or other process can be performed by software. Therefore, using existing hardware and adding software for performing the processes described above can realize the measuring system 1 of this embodiment. Thus, the structure is simple and advantageous for cost.

Although areas that are sectioned in the same manner are used for the process of calibrating and obtaining a parameter for each area and for the process of calculating three-dimensional coordinates by using the parameter in the embodiment described above, the areas can be different from each other. Namely, areas that are used for calibration may be larger than areas that are used for calculating three-dimensional coordinates so that the areas that are used for calibration are overlapped with each other, for example.

It is possible to determine a parameter for the interpolation area ES by various methods. For example, concerning a certain interpolation area ES, it is possible to determine an equation or a value of a parameter of the same type for a neighboring area ER by interpolation using a straight line or a B-spline curve concerning a pixel in the vertical direction or a pixel in the horizontal direction.

In the embodiment described above, the measuring system 1 corresponds to the three-dimensional shape input device of the present invention. However, a structure is possible in which the three-dimensional camera 2 performs all the processes instead of the host computer 3. In this case, the three-dimensional camera 2 corresponds to the three-dimensional shape input device of the present invention. In addition, it is possible that the three-dimensional camera 2 and the host computer 3 coordinate the processes in a manner different from the embodiment described above.

In the embodiment described above, an example of the light projection method is described in which deflected slit light U scans the object Q. However, the present invention can be applied to various structures of three-dimensional shape input devices utilizing the light projection method, including a structure in which the light projecting portion projects fixed slit light as detection light, and a structure in which a density pattern or a stripe pattern is projected as the detection light.

Furthermore, a structure of the memory 61M, contents of the look-up table LUT, as well as the structure, the configuration, the shape, the dimensions, the functions, the numbers, the positions, the process contents, the process order or others of the entire or a part of the three-dimensional camera 2, the host computer 3 or the measuring system 1 can be modified variously in accordance with the spirit of the present invention.

The present invention can be used for a three-dimensional shape input device that measures and enters a three-dimensional shape of an object in a noncontact manner by using the light projection method.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A three-dimensional shape input device for entering a three-dimensional shape of an object by a light projection method, the device comprising:
   a light projecting portion for projecting detection light onto an object;
   an imaging portion for receiving reflected light from the object;
   a dividing portion for dividing an imaging surface of an image sensor into a plurality of areas;
   a storage portion for storing a plurality of calibration parameters corresponding to the respective areas;
   a computing portion for computing and determining the three-dimensional shape of the object by using image data delivered from the imaging portion and the calibration parameters; and
   wherein the computing portion computes and determines the three-dimensional shape for each of the areas by using the respective calibration parameter applied to each of the plurality of areas.

2. The device according to claim 1, wherein the computing portion performs computation by using a camera sight line equation and a detection light plane equation.

3. The device according to claim 2, wherein the computing portion performs the computation for each of the areas by using a the respective calibration parameter to be applied to each of the areas as a camera parameter that is used for the camera sight line equation.

4. The device according to claim 2, wherein the computing portion performs the computation for each of the areas by using the respective calibration parameter to be applied to each of the areas as a light projecting optical system parameter that is used for the detection light plane equation.

5. The device according to claim 4, wherein the light projecting portion projects fixed slit light as the detection light.

6. The device according to claim 4, wherein the light projecting portion scans the object by deflecting projected slit light, and the computing portion performs the computation by using the respective calibration parameter to be applied to each of the areas that includes an angular velocity parameter of a deflecting mirror for deflecting the slit light.

7. The device according to claim 4, wherein the light projecting portion projects stripe pattern light as the detection light.

8. The device according to claim 1, wherein the respective calibration parameters are interpolated values so that a value of the respective calibration parameter is continuous at a boundary of the areas.

9. A three-dimensional shape input device for measuring and entering a three-dimensional shape of an object by a light projection method in accordance with image data that are obtained by receiving reflected light from the object by an imaging portion when detection light is projected onto the object, the device comprising:
- a storage portion for storing a plurality of calibration parameters that are used for computing the three-dimensional shape; and
- a computing portion for computing the three-dimensional shape of the object by using the image data and the respective calibration parameters,
- wherein the storage portion stores a calibration parameter corresponding to each of respective divided areas of an imaging surface of an image sensor, and the computing portion computes and determines the three-dimensional shape for each of the divided areas by using the corresponding calibration parameter applied to each of the areas.

10. The device according to claim 9, wherein the computing portion performs computation by using a camera sight line equation that is expressed by a camera parameter and a detection light plane equation that is expressed by a light projecting optical system parameter.

11. A three-dimensional shape input device for measuring and entering a three-dimensional shape of an object by a light projection method in accordance with image data that are obtained by receiving reflected light from the object by an imaging portion when detection light is projected onto the object, the device comprising:
- a dividing portion for dividing an imaging surface of an image sensor into a plurality of areas;
- an information adding portion for adding area division information that is information for discriminating an area to which each of the image data belong;
- a storage portion for storing a plurality of calibration parameters to be applied to each of the respective areas for computing the three-dimensional shape; and
- an output portion for delivering the image data and the respective calibration parameter.

12. A three-dimensional shape input device for entering a three-dimensional shape of an object by a light projection method, the device comprising:
- a light projecting portion for projecting detection light onto an object;
- an imaging portion for receiving reflected light from the object;
- a storage portion for storing a parameter that is used for computing the three-dimensional shape;
- a computing portion for computing and determining the three-dimensional shape of the object by using image data delivered from the imaging portion and the parameter; and
- a dividing portion for dividing an imaging surface of an image sensor into plural areas,
- wherein the storage portion stores parameters each of which is to be applied to each of the areas for use in a camera sight line equation, and the computing portion computes and determines the three-dimensional shape for each of the areas by using a parameter to be applied to each of the areas using the camera sight line equation and a detection light plane equation.

* * * * *

UNITED STATES PATENT AND TRADEMARK OFFICE
CERTIFICATE OF CORRECTION

PATENT NO. : 7,454,054 B2
APPLICATION NO. : 11/121333
DATED : November 18, 2008
INVENTOR(S) : Tadashi Fukumoto It is certified that error appears in the above-identified patent and that said Letters Patent is hereby corrected as shown below:

On the Title Page

Item (75), after "Fukumoto," delete "Ibaraki" and substitute --Osaka-- in its place.

Item (56), on the front sheet, right-hand side of page, line 4, after "10002711" delete "1/1999" and substitute --1/1998-- in its place.

In the Claims

In column 16, claim 3, line 60, before "the respective calibration" delete "a".

Signed and Sealed this

Fourth Day of August, 2009

JOHN DOLL
*Acting Director of the United States Patent and Trademark Office*